United States Patent
DeLuca et al.

(10) Patent No.: US 12,184,604 B2
(45) Date of Patent: Dec. 31, 2024

(54) DOMAIN NAME REGISTRATION BASED ON VERIFICATION OF ENTITIES OF RESERVED NAMES

(71) Applicant: Unstoppable Domains, Inc., Las Vegas, NV (US)

(72) Inventors: Lisa Seacat DeLuca, Bozeman, MT (US); Braden River Pezeshki, Reno, NV (US); Bradley L. Kam, San Francisco, CA (US)

(73) Assignee: Unstoppable Domains, Inc., Las Vegas, NV (US)

( * ) Notice: Subject to any disclaimer, the term of this patent is extended or adjusted under 35 U.S.C. 154(b) by 267 days.

(21) Appl. No.: 17/719,772

(22) Filed: Apr. 13, 2022

(65) Prior Publication Data

US 2023/0336523 A1    Oct. 19, 2023

(51) Int. Cl.
*H04L 61/3015* (2022.01)
*H04L 9/00* (2022.01)
*H04L 9/40* (2022.01)

(52) U.S. Cl.
CPC ...... *H04L 61/3025* (2013.01); *H04L 63/0815* (2013.01); *H04L 63/0876* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | |
|---|---|---|---|
| 7,548,968 B1 * | 6/2009 | Bura | G06F 21/604 |
| | | | 709/206 |
| 7,664,831 B2 * | 2/2010 | Cartmell | G06F 40/274 |
| | | | 709/219 |

(Continued)

FOREIGN PATENT DOCUMENTS

| | | |
|---|---|---|
| CN | 1984185 A | 6/2007 |
| WO | 2020/010023 A1 | 1/2020 |
| WO | 2022/087420 A1 | 4/2022 |

OTHER PUBLICATIONS

International Search Report and Written Opinion in corresponding International Application No. PCT/US23/65610, dated Jul. 31, 2023, 9 pages.

(Continued)

*Primary Examiner* — Backhean Tiv
(74) *Attorney, Agent, or Firm* — Edell, Shapiro & Finnan, LLC

(57) ABSTRACT

According to a present invention embodiment, a system for registering a domain name for access to a domain over a network comprises one or more memories and at least one processor coupled to the one or more memories. The system determines that a domain name requested for registration on a domain name registry by a user corresponds to a reserved name of an entity. The user is verified as corresponding to the entity based on detecting performance of an operation by the user on a computing device. The operation is enabled in response to verification of the entity. The domain name is registered on the domain name registry in response to the user corresponding to the entity. Embodiments of the present invention further include a method and computer program product for registering a domain name for access to a domain over a network in substantially the same manner described above.

24 Claims, 10 Drawing Sheets

(56) References Cited

U.S. PATENT DOCUMENTS

| | | | |
|---|---|---|---|
| 7,698,425 B2* | 4/2010 | Thayer | H04L 61/30 709/225 |
| 7,756,987 B2* | 7/2010 | Wang | H04L 61/30 709/239 |
| 8,010,674 B2* | 8/2011 | Fong | H04L 63/0823 709/202 |
| 8,239,677 B2* | 8/2012 | Colson | H04L 63/08 713/168 |
| 8,276,057 B2* | 9/2012 | Rowe | G06Q 30/02 715/205 |
| 8,285,830 B1* | 10/2012 | Stout | H04L 63/1441 709/224 |
| 8,312,364 B2* | 11/2012 | Rowe | G06Q 30/02 715/205 |
| 8,738,604 B2* | 5/2014 | Devarajan | G06F 16/951 707/827 |
| 8,751,586 B2* | 6/2014 | Adelman | G06Q 10/107 709/219 |
| 8,886,747 B1* | 11/2014 | Chen | G06F 16/955 709/224 |
| 8,904,040 B2* | 12/2014 | Adelman | G06Q 10/107 715/208 |
| 9,521,139 B2* | 12/2016 | Lee | H04L 63/0853 |
| 9,553,981 B2 | 1/2017 | Czarnecki et al. | |
| 9,769,117 B2* | 9/2017 | Yacoub | H04L 61/3025 |
| 9,779,125 B2* | 10/2017 | Gupta | H04L 67/02 |
| 9,785,663 B2* | 10/2017 | Gupta | G06F 16/23 |
| 10,178,069 B2* | 1/2019 | Li | H04L 61/302 |
| 10,296,569 B2* | 5/2019 | Akkarawittayapoom | G06Q 30/0277 |
| 10,382,388 B2* | 8/2019 | Li | G06Q 20/065 |
| 10,419,477 B2* | 9/2019 | Desai | H04L 63/1483 |
| 10,432,584 B1* | 10/2019 | Raman | H04L 63/1483 |
| 10,505,980 B2* | 12/2019 | Child | H04L 63/08 |
| 10,601,829 B1* | 3/2020 | Nelson | G06F 16/954 |
| 10,841,307 B2* | 11/2020 | Smith | H04L 9/321 |
| 10,846,762 B1 | 11/2020 | Dennis et al. | |
| 10,856,122 B2* | 12/2020 | Smith | H04L 63/1441 |
| 11,159,326 B1* | 10/2021 | Nelson | G06F 3/0484 |
| 11,190,355 B2* | 11/2021 | Wang | H04L 9/3231 |
| 11,196,573 B2* | 12/2021 | Roennow | H04L 63/0435 |
| 11,223,617 B2* | 1/2022 | Blinn | G06F 16/958 |
| 11,303,610 B2* | 4/2022 | Kamdar | H04L 61/3025 |
| 11,356,479 B2* | 6/2022 | Prakash | H04L 63/1483 |
| 11,388,165 B2* | 7/2022 | Epstein | H04L 63/1408 |
| 11,552,923 B2* | 1/2023 | Stahura | H04L 61/302 |
| 11,558,344 B1* | 1/2023 | Pezeshki | H04L 61/4511 |
| 11,689,546 B2* | 6/2023 | Rivlin | H04L 63/145 726/22 |
| 11,750,570 B1 | 9/2023 | Eby et al. | |
| 11,830,330 B1* | 11/2023 | Island | G06Q 20/40145 |
| 11,870,750 B1* | 1/2024 | Shah | H04L 61/3025 |
| 11,876,801 B2* | 1/2024 | Smith | H04L 9/3265 |
| 11,886,425 B2* | 1/2024 | Pezeshki | H04L 9/50 |
| 11,973,800 B2* | 4/2024 | Chen | H04L 61/5046 |
| 2002/0065903 A1* | 5/2002 | Fellman | H04L 61/3025 709/220 |
| 2006/0218289 A1* | 9/2006 | Assad | H04L 61/3015 709/229 |
| 2007/0294431 A1* | 12/2007 | Adelman | G06Q 10/107 709/245 |
| 2010/0017218 A1* | 1/2010 | Gazetova | G06Q 30/02 705/1.1 |
| 2010/0325128 A1* | 12/2010 | Adelman | H04L 61/30 707/769 |
| 2011/0055248 A1* | 3/2011 | Consuegra | G06Q 10/107 707/769 |
| 2011/0055331 A1* | 3/2011 | Adelman | G06Q 10/107 709/206 |
| 2011/0055562 A1* | 3/2011 | Adelman | H04L 63/126 713/168 |
| 2012/0072572 A1* | 3/2012 | Bladel | G06Q 30/02 709/224 |
| 2012/0166935 A1* | 6/2012 | Abhyanker | G06Q 30/02 715/234 |
| 2013/0262416 A1* | 10/2013 | Devarajan | G06F 16/90344 707/694 |
| 2013/0326368 A1* | 12/2013 | Voas | G06Q 50/60 715/753 |
| 2014/0188681 A1* | 7/2014 | Shahghasemi | G06Q 20/384 705/37 |
| 2014/0283106 A1* | 9/2014 | Stahura | G06Q 10/06 726/27 |
| 2015/0100507 A1* | 4/2015 | Levac | G06Q 50/184 705/310 |
| 2015/0302053 A1* | 10/2015 | Mitnick | H04L 61/3025 707/755 |
| 2015/0356523 A1 | 12/2015 | Madden | |
| 2016/0055490 A1* | 2/2016 | Keren | G06Q 30/00 705/14.47 |
| 2016/0217436 A1 | 7/2016 | Brama | |
| 2016/0241510 A1* | 8/2016 | Kamdar | H04L 67/01 |
| 2016/0330027 A1 | 11/2016 | Ebrahimi | |
| 2017/0132626 A1* | 5/2017 | Kennedy | G06Q 20/065 |
| 2017/0236123 A1* | 8/2017 | Ali | G06Q 20/3825 705/75 |
| 2017/0331896 A1* | 11/2017 | Holloway | H04L 67/04 |
| 2018/0246983 A1* | 8/2018 | Rathod | G06F 16/972 |
| 2019/0028432 A1* | 1/2019 | Li | H04L 61/302 |
| 2019/0096021 A1 | 3/2019 | Jarvis et al. | |
| 2019/0130399 A1* | 5/2019 | Wright | G06Q 20/401 |
| 2019/0163887 A1* | 5/2019 | Frederick | H04L 9/3239 |
| 2019/0279204 A1 | 9/2019 | Norton et al. | |
| 2019/0306158 A1* | 10/2019 | Jain | H04L 63/108 |
| 2020/0019680 A1* | 1/2020 | Frederick | G06F 21/31 |
| 2020/0036707 A1* | 1/2020 | Callahan | H04L 67/53 |
| 2020/0145373 A1* | 5/2020 | Richardson | H04L 9/50 |
| 2020/0186338 A1 | 6/2020 | Andon et al. | |
| 2020/0202668 A1 | 6/2020 | Cotta | |
| 2020/0406859 A1 | 12/2020 | Hassani | |
| 2021/0058353 A1 | 2/2021 | Creech et al. | |
| 2021/0097508 A1 | 4/2021 | Papanikolas | |
| 2021/0256070 A1* | 8/2021 | Tran | G06F 16/90332 |
| 2021/0357489 A1 | 11/2021 | Tali et al. | |
| 2022/0021537 A1* | 1/2022 | Wagner | H04L 9/3213 |
| 2022/0173893 A1* | 6/2022 | Basu | H04L 9/3247 |
| 2022/0198049 A1 | 6/2022 | Dumas et al. | |
| 2022/0198444 A1* | 6/2022 | Mee | G06Q 20/389 |
| 2022/0201036 A1* | 6/2022 | Nabeel | H04L 63/1425 |
| 2022/0222245 A1* | 7/2022 | Pezeshki | H04L 9/50 |
| 2022/0294630 A1* | 9/2022 | Collen | H04L 9/3213 |
| 2022/0342958 A1* | 10/2022 | Lillard | G06F 16/51 |
| 2022/0383296 A1* | 12/2022 | Gottschalk | G06Q 20/3672 |
| 2023/0057438 A1* | 2/2023 | Chen | H04L 61/5046 |
| 2023/0171225 A1 | 6/2023 | Pezeshki et al. | |
| 2023/0306443 A1* | 9/2023 | Murphy | H04L 63/126 |
| 2023/0336523 A1* | 10/2023 | DeLuca | H04L 63/0876 |
| 2023/0360031 A1* | 11/2023 | DeLuca | H04W 12/68 |
| 2023/0403154 A1* | 12/2023 | Kaizer | H04L 9/3218 |
| 2023/0403254 A1* | 12/2023 | Kaizer | H04L 61/3025 |
| 2023/0418979 A1* | 12/2023 | DeLuca | G06F 9/451 |
| 2023/0421399 A1 | 12/2023 | Quirk et al. | |
| 2024/0056525 A1 | 2/2024 | DeLuca | |
| 2024/0146523 A1 | 5/2024 | DeLuca et al. | |

OTHER PUBLICATIONS

Edward Jones, "How to Deploy NFT Smart Contracts", Better Programming, Dec. 2, 2021, https://betterprogramming.pub/how-to-deploy-nft-smart-contracts-9271ce5e91c0, 20 pages.

Jason Nelson, "Rug Pulls Force Solana NFT Marketplace Magic Eden to Invoke Doxing Policy for Creators", Decrypt, Feb. 21, 2022, https://decrypt.co/93474/rug-pulls-solana-nft-marketplace-magic-eden-doxing-policy-launchpad, 8 pages.

International Search Report and Written Opinion in International Application No. PCT/US23/66535, mailed Sep. 29, 2023, 8 pages.

Mitchell Anicas, "An Introduction to OAuth 2", DigitalOcean, https://www.digitalocean.com/community/tutorials/an-introduction-to-oauth-2, Jul. 21, 2014, 14 pages.

(56) References Cited

OTHER PUBLICATIONS

Wikipedia, "Blockchain", https://en.wikipedia.org/wiki/Blockchain, downloaded from the internet on Mar. 25, 2022, 27 pages.
"How does a transaction get into the blockchain?", Euromoney Learning, https://www.euromoney.com/learning/blockchain-explained/how-transactions-get-into-the-blockchain, downloaded from the internet on Mar. 25, 2022, 9 pages.
Benjamin Powers, "Brave Integrates Crypto Blockchain Domains, Expanding Access to Web 3.0—CoinDesk", https://www.coindesk.com/tech/2021/05/13/brave-integrates-crypto-blockchain-domains-expanding-access-to-web-30/, May 13, 2021, 10 pages.
"DNS Records Explained—Domain Name System Management", Domain.com, https://www.domain.com/help/article/dns-management-dns-records-explained, downloaded from the internet on Mar. 25, 2022, 5 pages.
Michele D'Aliessi, "How Does the Blockchain Work? A Guide to Everything You Need to Know", OneZero, https://onezero_medium.com/how-does-the-blockchain-work-98c8cd01d2ae, Jun. 1, 2016, 21 pages.
Blog, "Introducing Humanity Check—100% Opt-In", Unstoppable Domains, https://unstoppabledomains.com/blog/introducing-humanity-check, Mar. 13, 2022, downloaded from the internet on Mar. 25, 2022, 8 pages.
Amaury Martiny, "One-click Login with Blockchain: A MetaMask Tutorial", https://www.toptal.com/ethereum/one-click-login-flows-a-metamask-tutorial, downloaded from the internet on Mar. 25, 2022, 16 pages.
James Beck, Blog, "Mirror.xyz Review: How To Use MetaMask To Compete In The $Write Race", Jul. 30, 2021, https://consensys.net/blog/metamask/mirror-xyz-review-how-to-use-metamask-to-compete-in-the-write-race, 14 pages.
"Twitter verification requirements—how to get the blue check", https://help.twitter.com/en/managing-your-account/about-twitter-verified-accounts, downloaded from the internet on Mar. 25, 2022, 19 pages.
"Verify your site ownership—Search Console Help", https://support.google.com/webmasters/answer/9008080?hl=en#zippy=%2Chtml-file-upload, downloaded from the internet on Mar. 25, 2022, 5 pages.
Antoni Zolciak, "Beyond KYC: Stricter Privacy Policies are Looming, But DeFi is Here to Stay", https://www.nasdaq.com/articles/beyond-kyc%3A-stricter-privacy-policies-are-looming-but-defi-is-here-to-stay, Dec. 8, 2021, 7 pages.
"Humanity Check Overview", https://docs.unstoppabledomains.com/login-with-unstoppable/humanity-check/humanity-check-for-login/, downloaded from the internet on Apr. 7, 2022, 5 pages.
Jennifer Lowe, "What is KYC and why does it matter?", Plaid.com, Aug. 12, 2021, 15 pages.
"Ethereum Gas Tracker", downloaded from the internet on Feb. 28, 2024, 4 pages.
"Alchemy API Reference Overview", downloaded from the internet on Feb. 28, 2024, https://docs.alchemy.com/reference/api-overview, 8 pages.
Samaneh Tajalizadehkhoob, "New ICANN Project Explores the Drivers of Malicious Domain Name Registrations", ICANN Blogs, https://www.icann.org/en/blogs/details/new-icann-project-explores-the-drivers-of-malicious-domain-name-registrations-25-04-2023-en, Apr. 25, 2023, 3 pages.
"Why Are Some Domains Protected?", Unstoppable Domains, Mar. 11, 2022, https://support.unstoppabledomains.com/support/solutions/articles/48001186091-why-are-some-domains-protected, 3 pages.
"What is a non-fungible token (NFT)?", https://www.coinbase.com/learn/crypto-basics/plp-what-is-nft, downloaded from the internet on Mar. 25, 2022, 10 pages.

"Unstoppable Domains launches Login with Unstoppable", https://unstoppabledomains.com/blog/introducing-login-with-unstoppable, Jan. 9, 2022, 7 pages.
"ERC: Claim Holder—Issue #735", https://github.com/ethereum/eips/issues/735, GitHub, ethereum/EIPs, downloaded from the internet on Oct. 14, 2022, 21 pages.
"LIPs/LSPs/LSP-6-KeyManager.md", GitHub, lukso-network/LIPS, https://github.com/lukso-network/LIPs/blob/main/LSPs/LSP-6-KeyManager.md, downloaded from the internet on Oct. 14, 2022, 13 pages.
"Allowlists, denylists, and approved senders", Google Workspace Admin Help, https://support.google.com/a/answer/60752?hl=en#:~:text=Email allowlist—A list of, allowlist the contact's IP address 1, downloaded from the internet on Oct. 31, 2022, 1 page.
"S/MIME Digital Signatures", GlobalCerts, https://globalcerts.com/smime-digital-signatures, downloaded from the internet on Oct. 31, 2022, 5 pages.
"Progressive risk segmentation: your secret to balancing fraud prevention and conversion", https://withpersona.com, downloaded from the internet on Apr. 1, 2022, 7 pages.
Alex Gomez, "Unstoppable Domains Email (What Is it and How Does it Work?)", Cyber Scrilla, https://cyberscrilla.com/unstoppable-domains-email/#:~:text=How, Sep. 1, 2022, 43 pages.
Adriel Estrada, "Introducing Unstoppable Email with Skiff", Unstoppable Domains, https://unstoppabledomains.com/blog/categories/announcements/article/unstoppable-email-skiff, Aug. 30, 2022, 7 pages.
International Search Report and Written Opinion in International Application No. PCT/US23/68858, dated Oct. 19, 2023, 8 pages.
"DNS records for unstoppabledomains.com", Unstoppable Domains, https://www.nslookup.io/domains/unstoppabledomains.com/dns-records/, downloaded from the internet on Nov. 16, 2023, 5 pages.
International Search Report and Written Opinion in International Application No. PCT/US23/71399, dated Nov. 16, 2023, 10 pages.
Jeff Benson, "You Can Now Use Your .com Domain to Send and Receive Ethereum", https://decrypt.co/79517/you-can-now-use-your-com-domain-send-receive-ethereum Decrypt, Aug. 26, 2021, 8 pages.
"Claim your DNS name onchain in ENS", ENS, https://support.ens.domains/en/articles/7882690-claim-your-dns-name, downloaded from the internet on Feb. 9, 2024, 10 pages.
"Ethereum Name Service (ENS)", https://etherscan.io/token/0xc18360217d8f7ab5e7c516566761ea12ce7f9d72#readContract, downloaded from the internet on Feb. 9, 2024, 4 pages.
"Ethereum Name Service (ENS)", https://etherscan.io/token/0xc18360217d8f7ab5e7c516566761ea12ce7f9d72#writeContract, downloaded from the internet on Feb. 9, 2024, 2 pages.
"Unstoppable Domains (UD)", https://polygonscan.com/token/0xa9a6a3626993d487d2dbda3173cf58ca1a9d9e9f#readProxyContract, downloaded from the internet on Feb. 9, 2024, 3 pages.
"Unstoppable Domains (UD)", https://polygonscan.com/token/0xa9a6a3626993d487d2dbda3173cf58ca1a9d9e9f#writeProxyContract, downloaded from the internet on Feb. 9, 2024, 3 pages.
"Introducing Blend: the Peer-to-Peer Perpetual Lending Protocol for NFT's", https://x.com/blur_io/status/16530518092406046747?s=20, downloaded from the internet Jun. 26, 2024, 2 pages.
Owen Fernau, "Blur Launches NFT Lending Protocol", The Defiant, https://thedefiant.io/news/nfts-and-web3/blur-nft-lending, May 2, 2023, 7 pages.
"NFTs and Real-World Assets: A match made in heaven", Brú Finance, Mar. 14, 2024, https://medium.com/bru-finance/nfts-and-real-world-assets-a-match-made-in-heaven-6deb5365a343, 9 pages.
https://data.iana.org/TLD/tlds-alpha-by-domain.txt, downloaded from the internet on Aug. 30, 2024, 23 pages.
Wikipedia, "List of Internet top-level domains", https://en.wikipedia.org/wiki/List_of_Internet_top-level_domains, downloaded from the internet on Aug. 30, 2024, 67 pages.

\* cited by examiner

DOMAIN NAME REGISTRATION BASED ON VERIFICATION OF ENTITIES OF RESERVED NAMES

BACKGROUND

1. Technical Field

Present invention embodiments relate to access of domains over a network, and more specifically, to domain name registration of protected or otherwise reserved names (e.g., trademarks, brands, names of notable individuals, etc.) based on verification of entities of the reserved names.

2. Discussion of the Related Art

According to the Anticybersquatting Consumer Protection Act, domain squatting (also referred to as "cybersquatting") pertains to registering, trafficking in, or using an Internet domain name with a bad-faith intent to profit from the goodwill of a trademark belonging to another. In an attempt to reduce domain squatting, domain names protected by trademark are locked from sale until a user attempting to register a locked domain name can prove the user owns or represents the owner of the trademark for the locked domain name.

An example approach utilized during registration of a domain name may notify a user of a domain name that is locked, and direct the user to a manual process for proving ownership of the locked domain name to commence registration. However, this approach may consume a significant amount of time to unlock the domain name for registration.

SUMMARY

According to one embodiment of the present invention, a system for registering a domain name for access to a domain over a network comprises one or more memories and at least one processor coupled to the one or more memories. The system determines that a domain name requested for registration on a domain name registry by a user corresponds to a reserved name of an entity. The user is verified as corresponding to the entity based on detecting performance of an operation by the user on a computing device. The operation is enabled in response to verification of the entity. The domain name is registered on the domain name registry in response to the user corresponding to the entity. Embodiments of the present invention further include a method and computer program product (e.g., including one or more computer readable media with executable instructions) for registering a domain name for access to a domain over a network in substantially the same manner described above.

BRIEF DESCRIPTION OF THE DRAWINGS

Generally, like reference numerals in the various figures are utilized to designate like components.

DETAILED DESCRIPTION

An embodiment of the present invention employs a verification process during domain name registration to enable a user to secure registration for a protected or otherwise reserved name (e.g., a trademark, a brand, a name of a notable individual or organizational entity, etc.). The reserved name may include any name that is protected for, used by, and/or associated with an entity (e.g., person, group, company, corporation, association, organization, etc.), such as a trademark, a brand, a name of a notable person or organizational entity, etc. Further, the reserved name may include any quantity of terms, words, tokens, or arrangements of any quantity of elements (e.g., alphanumeric or other characters, symbols, numbers, etc.).

The present invention embodiment enables the user attempting to register a domain name corresponding to the reserved name to prove the user corresponds to the entity of the reserved name during the domain name registration process (e.g., the user is the entity that owns, uses, and/or has rights to the reserved name, the user is authorized by and/or represents the entity of the reserved name, the user otherwise has authority with respect to the reserved name to register the domain name, etc.). The verification process may be performed using a verified third party solution. The domain name registration process is modified to provide instant verification of a user with respect to a reserved name through the verification process. The verification process may verify that a user corresponds to an entity of a reserved name via a linked social media or other account of the entity of the reserved name, an electronic wallet of the entity of the reserved name, proof of registration of a reserved name on another domain based system, and/or biometrics.

Figure 1:
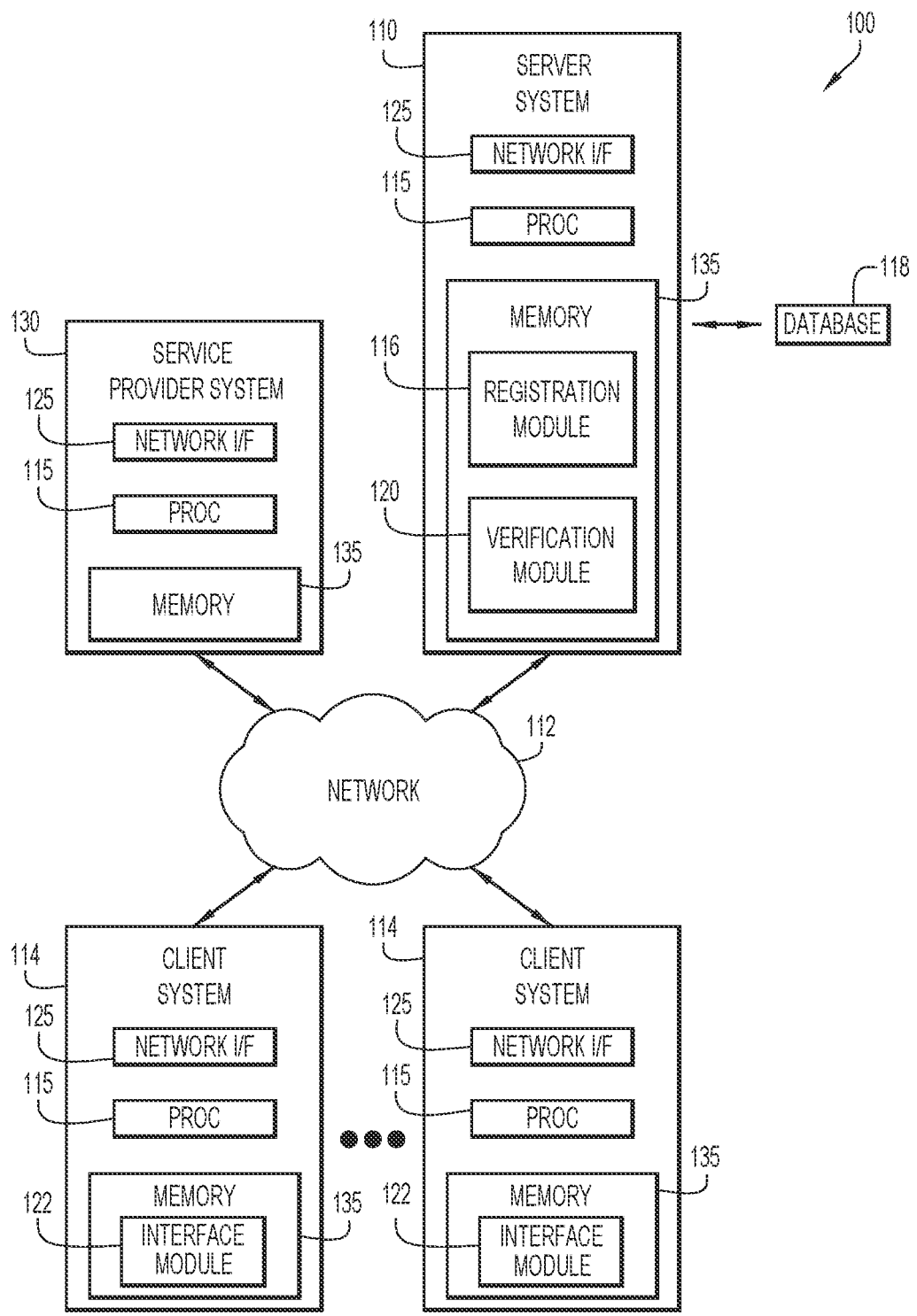
FIG. 1 is a diagrammatic illustration of an example computing environment according to an embodiment of the present invention.

An example environment 100 for use with present invention embodiments is illustrated in FIG. 1. Specifically, environment 100 includes one or more server systems 110, one or more client or end-user systems 114, and one or more service provider systems 130. Server systems 110, client systems 114, and service provider systems 130 may be remote from each other and communicate over a network 112. The network may be implemented by any number of any suitable communications media (e.g., wide area network (WAN), local area network (LAN), Internet, Intranet, etc.). Alternatively, server systems 110, client systems 114, and/or service provider systems 130 may be local to each other, and communicate via any appropriate local communication medium (e.g., local area network (LAN), hardwire, wireless link, Intranet, etc.).

Client systems 114 include an interface module 122 to enable users to submit requests to server systems 110 to register a domain name. The interface module may include any conventional or other browser. The server systems include a registration module 116 and a verification module 120. The registration module interfaces with a user via client system 114 to perform domain name registration, while verification module 120 verifies proof of ownership or authorization for a user registering a domain name corresponding to a reserved name as described below. Server systems 110 may further provide management of a blockchain. The service provider systems 130 may include any third party or other server systems implementing or providing various social media or other network sites and/or other services (e.g., reserved name look-up, blockchain management, domain registry management, user accounts of network sites, etc.).

A database system 118 may store various information for the analysis (e.g., domain name registrations, mappings of users to social media or other accounts, etc.). The database system may be implemented by any conventional or other database or storage unit, may be local to or remote from server systems 110, client systems 114, and/or service provider systems 130, and may communicate via any appropriate communication medium (e.g., local area network (LAN), wide area network (WAN), Internet, hardwire, wireless link, Intranet, etc.). The client systems 114 may present a graphical user (e.g., GUI, etc.) or other interface (e.g., command line prompts, menu screens, etc.) to interact with users pertaining to the desired domain name registrations, and may provide reports or notifications pertaining to registration results (e.g., results of registration, reserved names, results of verification, etc.).

Server systems 110 and client systems 114 may be implemented by any conventional or other computer systems preferably equipped with a display or monitor, a base, optional input devices (e.g., a keyboard, mouse or other input device), any software for use by present invention embodiments (e.g., server/communications software, registration module 116, verification module 120, interface module 122, etc.). The base may include at least one hardware processor 115 (e.g., microprocessor, controller, central processing unit (CPU), etc.), one or more memories 135, and/or internal or external network interfaces or communications devices 125 (e.g., modem, network cards, etc.)).

Service provider systems 130 may be implemented by any conventional or other computer systems preferably equipped with a display or monitor, a base, optional input devices (e.g., a keyboard, mouse or other input device), and any commercially available or custom software (e.g., server/communications software, social media or other network site software, service software, etc.). The base may include at least one hardware processor 115 (e.g., microprocessor, controller, central processing unit (CPU), etc.), one or more memories 135, and/or internal or external network interfaces or communications devices 125 (e.g., modem, network cards, etc.)).

Registration module 116, verification module 120, and interface module 122 may include one or more modules or units to perform the various functions of present invention embodiments described below. The various modules (e.g., registration module 116, verification module 120, interface module 122, etc.) may be implemented by any combination of any quantity of software and/or hardware modules or units, and may reside within memory 135 of the server and/or client systems for execution by a corresponding processor 115.

Figure 2:
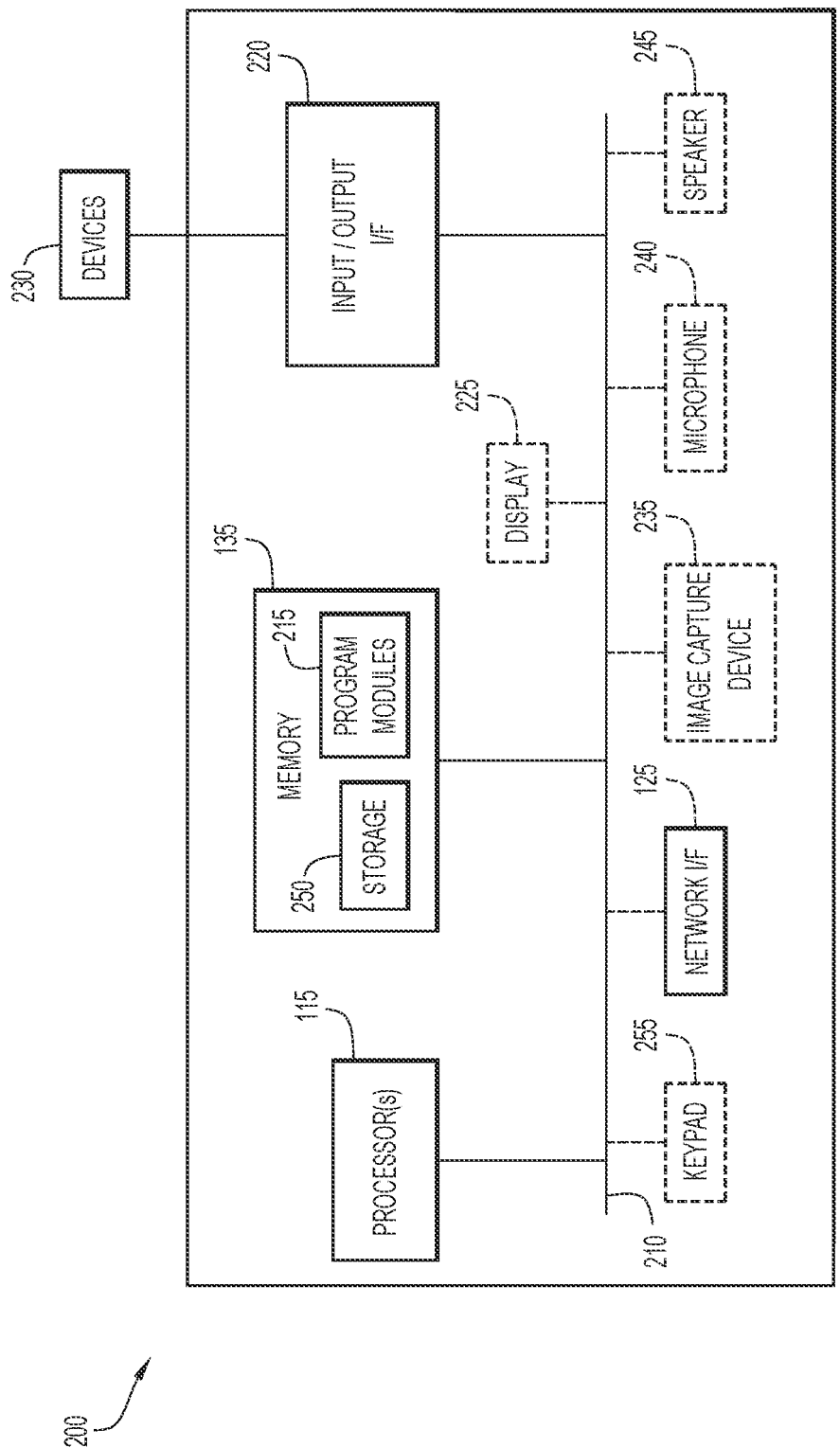
FIG. 2 is a block diagram of an example computing device according to an embodiment of the present invention.

An example of a computing device 200 of environment 100 (e.g., implementing server system 110, client system 114, and/or service provider system 130) is illustrated in FIG. 2. The example computing device may perform the functions described herein. Computing device 200 may be implemented by any personal or other type of computer or processing system (e.g., desktop, laptop, hand-held device, smartphone or other mobile device, etc.), and may be used for any computing environments (e.g., cloud computing, client-server, network computing, mainframe, stand-alone systems, etc.).

Computing device 200 may include one or more processors 115 (e.g., microprocessor, controller, central processing unit (CPU), etc.), network interface 125, memory 135, a bus 210, and an Input/Output interface 220. Bus 210 couples these components for communication, and may be of any type of bus structure, including a memory bus or memory controller, a peripheral bus, and a processor or local bus using any of a variety of conventional or other bus architectures. Memory 135 is coupled to bus 210 and typically includes computer readable media including volatile media (e.g., random access memory (RAM), cache memory, etc.), non-volatile media, removable media, and/or non-removable media. For example, memory 135 may include storage 250 containing nonremovable, non-volatile magnetic or other media (e.g., a hard drive, etc.). The computing device may further include a magnetic disk drive and/or an optical disk drive (not shown) (e.g., CD-ROM, DVD-ROM or other optical media, etc.) connected to bus 210 via one or more data interfaces.

Moreover, memory 135 includes a set of program modules 215 (e.g., corresponding to registration module 116, verification module 120, interface module 122, etc.) that are configured to perform functions of present invention embodiments described herein. The memory may further include an operating system, at least one application and/or other modules, and corresponding data. These may provide an implementation of a networking environment.

Input/Output interface 220 is coupled to bus 210 and communicates with one or more peripheral or external devices 230 (e.g., a keyboard, mouse or other pointing device, a display, biometric sensing devices, etc.), at least one device that enables a user to interact with computing device 200, and/or any device (e.g., network card, modem, etc.) that enables computing device 200 to communicate with one or more other computing devices. Computing device 200 may communicate with one or more networks (e.g., a local area network (LAN), a wide area network (WAN), a public network (e.g., the Internet), etc.) via network interface 125 coupled to bus 210.

With respect to certain entities (e.g., client system 114, etc.), computing device 200 may further include, or be coupled to, a touch screen or other display 225, a camera or image capture device 235, a microphone or other sound sensing device 240, a speaker 245 to convey sound, and/or a keypad or keyboard 255 to enter information (e.g., alphanumeric information, etc.). These items may be coupled to bus 210 or Input/Output interface 220 to transfer data with other elements of computing device 200.

By way of example, present invention embodiments pertain to registration of a blockchain domain name or a non-fungible token (NFT) domain name. Initially, a blockchain is generally in the form of a ledger that includes a series of records or blocks chained or linked together. Each block includes a hash of the prior block in the blockchain, a timestamp, and transaction information. The hash of the prior block enables the blockchain to be resistant to modification since changes to data in any prior block alters the hash value which propagates to subsequent blocks.

A blockchain is typically managed by a peer-to-peer network and used as a distributed ledger. Nodes of the peer-to-peer network communicate and verify new blocks according to a protocol. The peer-to-peer network provides a de-centralized approach, where each node has a copy of the blockchain. Transactions are transmitted to the network, where mining nodes process the transactions. The mining nodes validate a transaction, insert the transaction into a current block, and transmit the block to the other nodes. Various consensus approaches may be used for combining validation results of different mining nodes to determine validity of a transaction (or block). In addition, a blockchain may store software (e.g., typically referred to as smart contracts) that executes in response to occurrence of pre-defined conditions. A blockchain may be public (e.g., no access restrictions, etc.), private (e.g., restricted access, etc.), or hybrid (e.g., with centralized and de-centralized features).

Users of transactions for the blockchain are authenticated based on cryptographic keys. These keys identify a user and provide access to a user account or wallet. The user wallet is basically an application or software that enables users to store and access digital assets (e.g., for receiving or sending cryptocurrency or other fungible tokens, non-fungible tokens (NFT), etc.). For example, a non-fungible token (NFT) is a crypto type asset with each token being unique (and representing items, such as digital art, music, or video game items), whereas fungible tokens (e.g., coins of the same cryptocurrency) have the same value of worth and are exchangeable. Each user is associated with their own private key (e.g., accessible only to the associated user, etc.) and a public key (e.g., typically an address on the blockchain). The private and public keys enable authentication of the user based on digital signatures in order to commence a transaction. The user account or wallet typically stores the private key.

For example, in order for the user to send cryptocurrency, a message for a transaction is encrypted with the private key of the user wallet. The private key enables only the user to control the user wallet. A digital signature is created by encrypting the message with the private key, where the digital signature is used to verify the user and transaction. The message may be decrypted with the corresponding public key of the user wallet. Since the private key is unique to the user, successful decryption of the message with the corresponding public key verifies the message was sent by the user. Once verified, the transaction may be posted to the blockchain, thereby adjusting the user wallet based on the transaction.

A blockchain domain name is stored on a blockchain. The blockchain domain name may be a non-fungible token (NFT) domain name that is associated with a non-fungible token (NFT) stored in a user wallet. The blockchain domain name may be associated with various information (e.g., wallet addresses, user information (e.g., name, address, email, etc.), data or other access restrictions, etc.). The blockchain domain name is associated with software or smart contracts on the blockchain that may perform various functions (e.g., provide a registry for corresponding wallet addresses, indicate locations of content for the domain (e.g., or a website, etc.) hosted on the blockchain or other system, etc.). In order to access a blockchain domain, the blockchain is accessed to find the record corresponding to the blockchain domain name (which may initiate the corresponding smart contracts for the corresponding functionality). The private key of the user wallet enables the user to have sole control of the blockchain domain name (e.g., authenticating operations or transactions for the blockchain domain name similar to the cryptocurrency example described above, etc.). For example, the user may have sole control to perform operations that alter content and/or functionality for the blockchain domain name.

However, present invention embodiments may be utilized for domain name registration for any centralized and/or de-decentralized systems (e.g., blockchain, Domain Name System (DNS), etc.).

Figure 3:
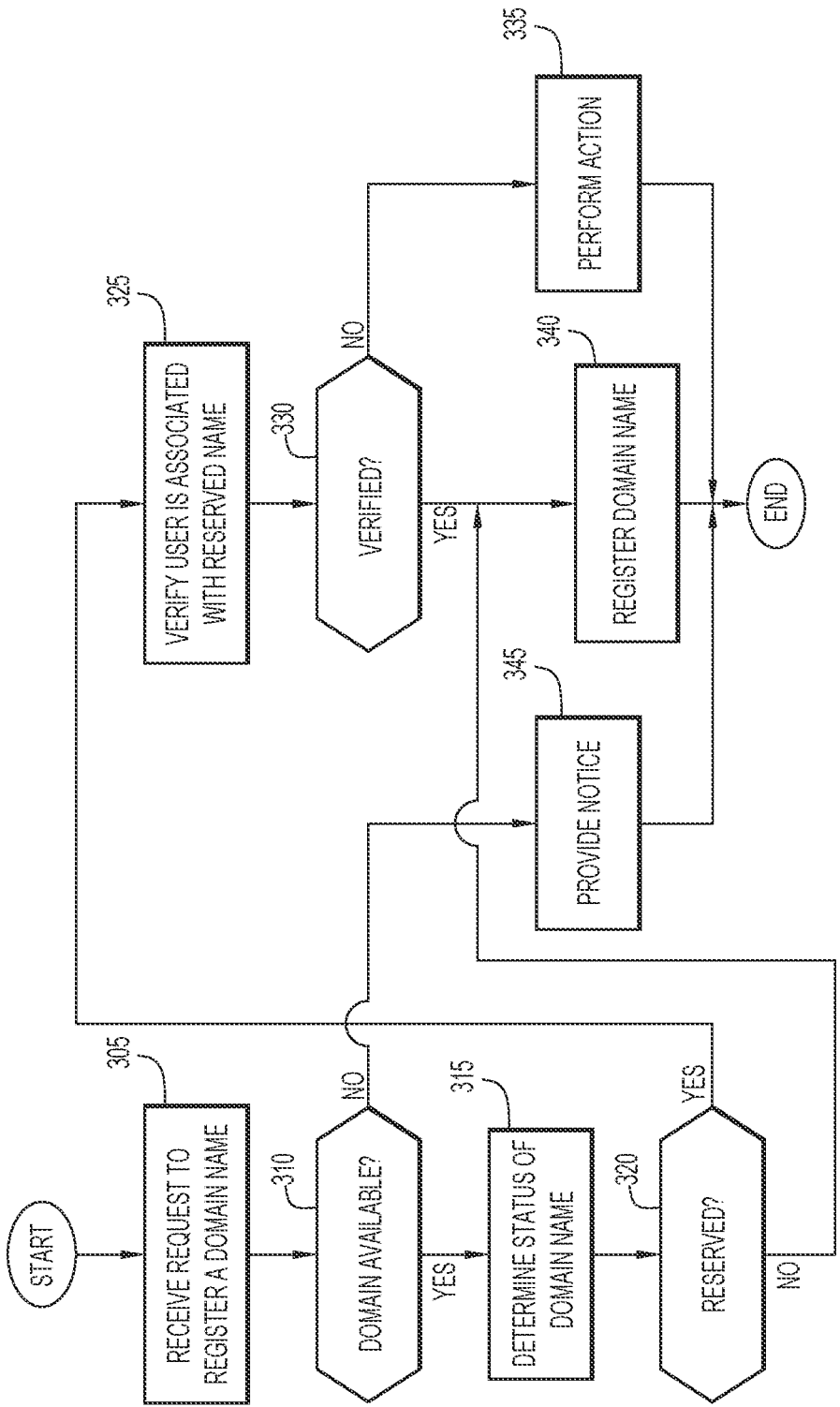
FIG. 3 is a flowchart of a method of registering domain names according to an embodiment of the present invention.

A method of registering a domain name (e.g., via registration module 116, verification module 120, and server system 110 and/or client system 114) according to an embodiment of the present invention is illustrated in FIG. 3. Initially, a user desires to register a domain name, and a request including the domain name is sent to server system 110 from a client system 114 to initiate registration of the domain name. The domain name may be entered on a user interface of client system 114 (e.g., FIGS. 9 and 10). The domain name may include any quantity of terms, words, tokens, or arrangements of any quantity of any types of elements (e.g., alphanumeric or other characters, symbols, numbers, etc.).

The domain name preferably includes a name portion and an optional extension that is associated with or indicates a hosting blockchain. By way of example, the domain name may be of the form "name.e1" where "name" is the name portion and ".e1" is the extension. Alternatively, the domain name may include the name portion without the extension. The name portion and extension of the domain name may each include any quantity of terms, words, tokens, or arrangements of any quantity of any types of elements (e.g., alphanumeric or other characters, symbols, numbers, etc.).

The request is received and processed by registration module 116 of server system 110 at operation 305. The registration module determines availability of the requested domain name at operation 310. This may be accomplished by accessing one or more domain name registries. Each domain name registry is associated with one or more extensions, and includes one or more registry entries. A registry entry of a domain name registry indicates registration of a corresponding domain name for one or more extensions of that registry. The one or more domain name registries are accessed to determine a presence of one or more registry entries that correspond to the requested domain name.

A registry entry for a domain name registry may correspond to the requested domain name when the registry entry contains the name portion of the requested domain name, or the name portion of the requested domain name with at least one extension associated with that registry. When one or more registry entries corresponding to the requested domain name exist in the accessed domain name registries, the requested domain name is already registered for the extensions associated with the one or more registry entries and, therefore, unavailable for registration in the corresponding accessed domain name registries for those extensions. For example, the requested domain name may be unavailable for registration for a first extension, but may be available for registration for one or more different extensions.

In addition, registry entries for domain names similar to the requested domain name may be maintained for identifying reserved names as described below. For example, a domain name of a registry entry may be considered similar to the requested domain name based on the name portion of the domain name of the registry entry having a varied spelling (but substantially the same pronunciation) with respect to the name portion of the requested domain name. Further, the domain name of the registry entry may be considered similar to the requested domain name based on the name portion of the requested domain name being part of or including the name portion of the domain name of the registry entry (e.g., the name portion of the requested domain name is a subset or superset of the name portion of the domain name of the registry entry). The registry entries for similar domain names may include information concerning an entity of the registered domain name for verification as described below. This information may be used to search for social media or other accounts (e.g., user accounts, wallets, etc.) for the entity (or a representative of the entity). The social media or other accounts may be used for verification of a user for domain name registration as described below.

A domain name registry may be implemented by any suitable registry, directory, listing, or other structure containing registered domain names. A registry entry may contain any information pertaining to registration of a domain name (e.g., name portion, one or more extensions, owner information, etc.). For example, the user may be requesting a blockchain domain name. In this case, one or more blockchains (e.g., associated with different extensions, etc.) storing domain name registration transactions may be traversed to determine the presence of registration entries corresponding to the requested domain name and availability of the requested domain name for registration.

When the requested domain name is not available for registration on any of the accessed domain name registries as determined at operation 310 (e.g., no extensions for the requested domain name are available, etc.), a notification is provided to the user on the user interface of client system 114 indicating unavailability of the requested domain name for registration at operation 345.

When the requested domain name is available for registration on at least one of the accessed domain name registries as determined at operation 310 (e.g., at least one extension is available for the requested domain name, etc.), registration module 116 of server system 110 determines a status of the requested domain name as corresponding to a reserved name at operation 315. A reserved name may include any name that is protected for, used by, and/or associated with an entity (e.g., person, group, company, corporation, association, organization, etc.), such as a trademark, a brand, a name of a notable individual or organizational entity, registered domain name, etc. This may be accomplished by searching network sites (and/or other data sources) for use of the requested domain name. The use indicates that the requested domain name may be a reserved name of an entity (e.g., person, group, company, corporation, association, organization, etc.) for which verification is needed for domain name registration.

For example, registration module 116 may crawl network sites (and/or other data sources) and perform a search pertaining to the requested domain name to identify use of the requested domain name by an entity (e.g., person, group, company, corporation, association, organization, etc.). The network sites may include social media sites, entity web sites, various registration sites (e.g., trademark sites, domain name sites, etc.), etc. The use may include the requested domain name being employed as a trademark, a brand, a name of a notable individual or organizational entity, a user handle or user identification, or a registered domain name. The use may further include the requested domain name being employed in any other manner of associating the requested domain name with the entity. Further, the use of the requested domain name identified by the search may include use of the name portion of the requested domain name, or use of the name portion of the requested domain name with an extension.

The search may employ any conventional or other techniques to identify use of the requested domain name. For example, the search may use any conventional or other natural language processing (NLP) techniques (e.g., entity recognition, relationship detection, etc.) to identify entities (e.g., individuals, organizational entities, etc.) and their relationship to the requested domain name within content of network sites. The use of the requested domain name may be determined based on the relationships between the identified entities and the requested domain name (e.g., an owns or has relationship, etc.). Further, the search may identify text and/or symbols within the content of network sites indicating use of the requested domain name (e.g., a trademark or other symbol, a web site extension, a symbol or identifier indicating a user handle or user identification, etc.). In addition, proximity of the requested domain name to entities within text of the content of network sites may indicate use of the requested domain name by the entities.

The entities associated with the identified uses of the requested domain name may be determined based on the network sites providing the identified uses. For example, an individual or organizational entity associated with an identified use may be determined from an account of a social media or other network site providing the identified use (e.g., via a user handle or user identification, etc.). Further, the entities associated with the identified uses may be determined based on the entities and relationships identified by natural language processing (NLP) techniques as described above. In addition, the entities may be determined based on proximity to the requested domain name within text of the content of network sites providing the identified uses as described above.

With respect to an organizational entity using the requested domain name, an account of a social media or other network site may indicate an entity (or individual) associated with or authorized by the organizational entity with respect to the use of the requested domain name. For example, a social media site of an organizational entity may indicate a name and title of a person with respect to the organizational entity, thereby indicating the person is authorized by the organizational entity. Another type of network site may indicate a representative of an organizational entity. An individual may similarly authorize another entity (or individual) to act on their behalf with respect to use of the requested domain name which may be indicated on the network sites providing the identified uses. The user requesting domain name registration may be verified as corresponding to an entity with authorization for a reserved name as described below.

The accounts (e.g., user accounts, profiles, wallets, etc.) of social media or other network sites of the entities of the identified uses may be determined based on the network sites and entities associated with the identified uses. For example, the network sites may include user accounts of entities using the requested domain name. Further, a search may be performed based on names of the entities of the identified uses (or their corresponding authorized representatives) to determine social media or other accounts (e.g., user accounts, wallets, etc.) for the entities (or their corresponding authorized representatives).

In addition, the identified uses may include the similar domain names from the availability determination described above. The registry entries for the similar domain names may include information concerning an entity of the registered domain name for verification. This information may be used to search for social media or other accounts (e.g., user accounts, profiles, wallets, etc.) for the entity (or a representative of the entity) in substantially the same manner described above.

The identified uses may be examined to determine uses of the requested domain name by notable individuals or organizational entities. Notable individuals or organizational entities may be determined based on fame, popularity, a level of name recognition, followership, etc. For example, a pre-defined list of notable individuals and/or organizational entities may be maintained and compared to the entities of the identified uses to determine the uses by notable individuals or organizational entities.

Further, characteristics of the social media or other accounts of the entities of the identified uses may be used to determine uses by notable individuals or organizational entities. For example, the social media or other accounts that satisfy one or more criteria (e.g., have a number of followers, connections, or other linked accounts above a threshold amount (e.g., at least approximately one million, etc.), have a frequency or amount of activity or postings above a threshold amount (e.g., at least a thousand postings per day, etc.), are active for more than a predetermined amount of time (e.g., at least 2 years, etc.), etc.) are considered to provide use of the requested domain name by notable individuals or organizational entities.

In addition, a verification process of a social media or other network site of an individual or organizational entity may be used to ensure that the requested domain name is in use by, or associated with, an account of the actual entity (e.g., person, group, company, corporation, association, organization, etc.), as opposed to, for example, a dummy account established by another entity. For example, a social media site may employ a verification process to verify identities of users. Once a user is verified, the account of the user displays an icon or other symbol indicating that the identity of the user is verified. In this case, registration module 116 may determine that an account of an entity associated with an identified use is verified in order to ensure that the use of the requested domain name was performed by the actual entity. Alternatively, registration module 116 may request that an account owner perform the verification process of a social media site for an unverified account to ensure that the use of the requested domain name was performed by the actual entity.

The verification process of the social media or other network sites may be used to determine the identified uses by notable individuals or organizational entities, where the social media or other accounts used for the determination may be limited to verified accounts. Further, the determined social media or other accounts of entities of the identified uses may be limited to verified accounts for verifying a user for domain name registration as described below.

The requested domain name is considered to correspond with a reserved name when at least one identified use of the requested domain name is by a notable individual or organizational entity. However, the requested domain name may be considered to correspond with a reserved name based on use of the requested domain name by any individual or organizational entity.

The search for the requested domain name may be conducted on-demand in response to each request for registration of a domain name. The search for the requested domain name may be performed as part of the availability determination of the requested domain name with respect to the one or more domain name registries. However, the search for the requested domain name may be performed prior, during, or after the availability determination. The search for the requested domain name may search any quantity of any types of data sources in substantially the same manner described above (e.g., network sites, databases, registries, etc.).

The status of the requested domain name as corresponding to a reserved name may alternatively be determined by registration module 116 accessing a listing of reserved names and determining that a listing entry corresponds to the requested domain name. A listing entry for a reserved name may include various information (e.g., reserved name, entity associated with the reserved name, social media or other account, network site providing the reserved name, etc.). A listing entry may correspond to the requested domain name when the reserved name of the listing entry contains the name portion of the requested domain name, or the name portion of the requested domain name with an extension. For example, the presence of a listing entry corresponding to the requested domain name indicates that the requested domain name corresponds to a reserved name.

The listing of reserved names may be produced and maintained by registration module 116. For example, registration module 116 may crawl network sites (and/or other data sources) (e.g., social media sites, entity web sites, various registration sites (e.g., trademark sites, domain name sites, etc.), etc.) on a periodic or other basis (e.g., schedule, based on updates to network sites, requests for registration, etc.) to identify reserved names. The reserved names may be names in use by, and/or associated with, an entity (e.g., person, group, company, corporation, association, organization, etc.). The reserved name (or name in use) may include any quantity of terms, words, tokens, or arrangements of any quantity of elements (e.g., alphanumeric or other characters, symbols, numbers, etc.). The use may include a name being employed as a trademark, a brand, a name of a notable individual or organizational entity, a user handle or user identification, or a registered domain name. The use may further include the name being employed in any other manner of associating the name with the entity.

The use of the names on network sites (and/or other data sources), corresponding entities, and social media or other accounts (e.g., user accounts, profiles, wallets, etc.) of the entities may be identified in substantially the same manner described above with respect to determining use of the requested domain name. Further, the names may be examined to determine names that are associated with uses by notable individuals or organizational entities in substantially the same manner described above (e.g., based on a pre-defined list of notable individuals and organizational entities, based on characteristics of the social media or other accounts providing the names, etc.). In addition, a verification process of a social media or other network site of an individual or organizational entity may be used to ensure that a name is in use by, or associated with, an account of the actual entity (e.g., person, group, company, corporation, association, organization, etc.) in substantially the same manner described above.

The verification process of the social media or other network site may be used to determine the names used by notable individuals or organizational entities, where the social media or other accounts used for the determination may be limited to verified accounts. Further, the determined social media or other accounts of entities of the names may be limited to verified accounts for verifying a user for domain name registration as described below.

A name is considered to be a reserved name when the name is used by a notable individual or organizational entity. However, the name may be considered to be a reserved name based on use by any individual or organizational entity. The resulting reserved names and their corresponding entities and social media or other accounts (e.g., determined based on notable individuals or organizational entities, verified accounts, etc.) may be stored in the listing in corresponding listing entries. Moreover, the similar domain names from the availability determination described above may also be stored in the listing in corresponding entries. These similar domain names may be filtered in substantially the same manner described (e.g., based on notable individuals or organizational entities, verified accounts, etc.) for storage in the listing. In addition, any quantity of any types of data sources may be searched in substantially the same manner described above (e.g., network sites, databases, registries, etc.) to generate the listing of reserved names.

Moreover, registration module 116 may generate and send a request to a look-up service provided by a service provider system 130 to determine the status of the requested domain name as corresponding to a reserved name. The look-up service may maintain a listing of reserved names, and/or crawl network sites (and/or other data sources) (e.g., social media sites, entity web sites, various registration sites (e.g., trademark sites, domain name sites, etc.), one or more domain name registries, etc.) to determine the status of the requested domain name as corresponding to a reserved name. The look-up service provides a response indicating the presence (or absence) of a corresponding reserved name. When the requested domain name corresponds to a reserved name, the response from the service provider system may provide various information (e.g., the corresponding reserved name, individual or organizational entity using or associated with the reserved name, network sites or other data sources using or containing the reserved name, etc.). This information may be used to search for, or determine, social media or other accounts (e.g., user accounts, profiles, wallets, etc.) for the entity (or a representative of the entity) of the corresponding reserved name. Further, the similar domain names from the availability determination described above may be combined with the results from the look-up service. The look-up service results and similar domain names may be filtered in substantially the same manner described (e.g., based on notable individuals or organizational entities, verified accounts, etc.) in order to be used to verify the user.

In addition, the requested domain name may be determined to correspond to a reserved name based on a reserved name identified from the search or listing being similar to the requested domain name. Further, the look-up service may identify a reserved name similar to the requested domain name. For example, a reserved name may be considered similar to the requested domain name based on the reserved name having a varied spelling (but substantially the same pronunciation) with respect to the name portion of the requested domain name. Further, the reserved name may be considered similar to the requested domain name based on the name portion of the requested domain name being part of or including the reserved name (e.g., the name portion of the requested domain name is a subset or superset of the reserved name, etc.). The corresponding entity of the reserved name and social media or other accounts (e.g., user accounts, profiles, wallets, etc.) of the entity may be identified in substantially the same manners described above, where resulting social media or other accounts for the entity of a reserved name similar to the requested domain name are used for verification of a user for domain name registration.

The determination of the requested domain name as corresponding to a reserved name is preferably conducted as part of the availability determination of the requested domain name with respect to the one or more domain name registries. However, this determination may be performed prior, during, or after the availability determination.

When the requested domain name corresponds to a reserved name as determined at operation 320, verification module 120 of server system 110 verifies the user as having authority to register the requested domain name at operation 325. The verification basically determines that the user is an owner of, and/or has rights or authorization with respect to, the reserved name in order to enable registration of the requested domain name. The verification may be performed in various manners. For example, the verification may include detecting performance by the user of an operation of the entity of the reserved name. The operation preferably requires authentication of the entity (e.g., access or use of an account or information of the entity that is password or otherwise protected, etc.). By way of example, verification module 120 may select a social media or other account of an authorized entity (e.g., owner, representative, etc.) of the reserved name, and request the user to perform certain actions in that social media or other account (e.g., log in, post information, etc.). Verification module 120 confirms appropriate performance of the actions to verify the user for registering the requested domain name as described below.

By way of further example, verification module 120 may utilize a wallet of the entity of the reserved name to verify the user as the entity of the reserved name. In the case of the reserved name being a registered domain of another domain based system, proof of the registration may be utilized to verify the user as the entity of the reserved name.

In addition, biometrics of the user may be captured by a client system 114 and compared to biometrics provided on a government or other officially-issued identification for the entity of the reserved name for user verification. The manners of verification may be used individually, or in any combination, to verify the user as the entity of the reserved name.

When the user is verified as the entity of the reserved name as determined at operation 330, registration module 116 registers the requested domain name at operation 340. For example, the user may select one or more available extensions for the requested domain name on the user interface of client system 114. The registration module creates and posts a transaction (and other information) to a corresponding blockchain associated with each selected extension to register the requested domain name for that extension. In the case of a non-fungible token (NFT) domain name, a non-fungible token (NFT) for each domain registration is created and placed in the user wallet. For example, a non-fungible token (NFT) for a domain name may be associated with an address of a cryptocurrency wallet of the user. Once a domain registration is posted to the blockchain, only the user may perform operations with respect to the domain, such as adding/altering content and/or functionality.

When the user is not verified as the entity of the reserved name as determined at operation 330, various actions may be performed at operation 335. User verification may have failed due to various circumstances. By way of example, the entity may not have associated accounts for the verification, or the user could not recall or have access to the account information. In any event, registration module 116 may deny registration of the requested domain name, and/or provide a notification or error message indicating failure of the verification. In addition, registration module 116 may direct the user to perform a manual process of verification (e.g., electronically or otherwise submitting forms and/or evidence, etc.).

The process may be repeated to request a different domain name for registration, and/or repeat the verification process for a denied domain name registration, in substantially the same manner described above.

Figure 4:
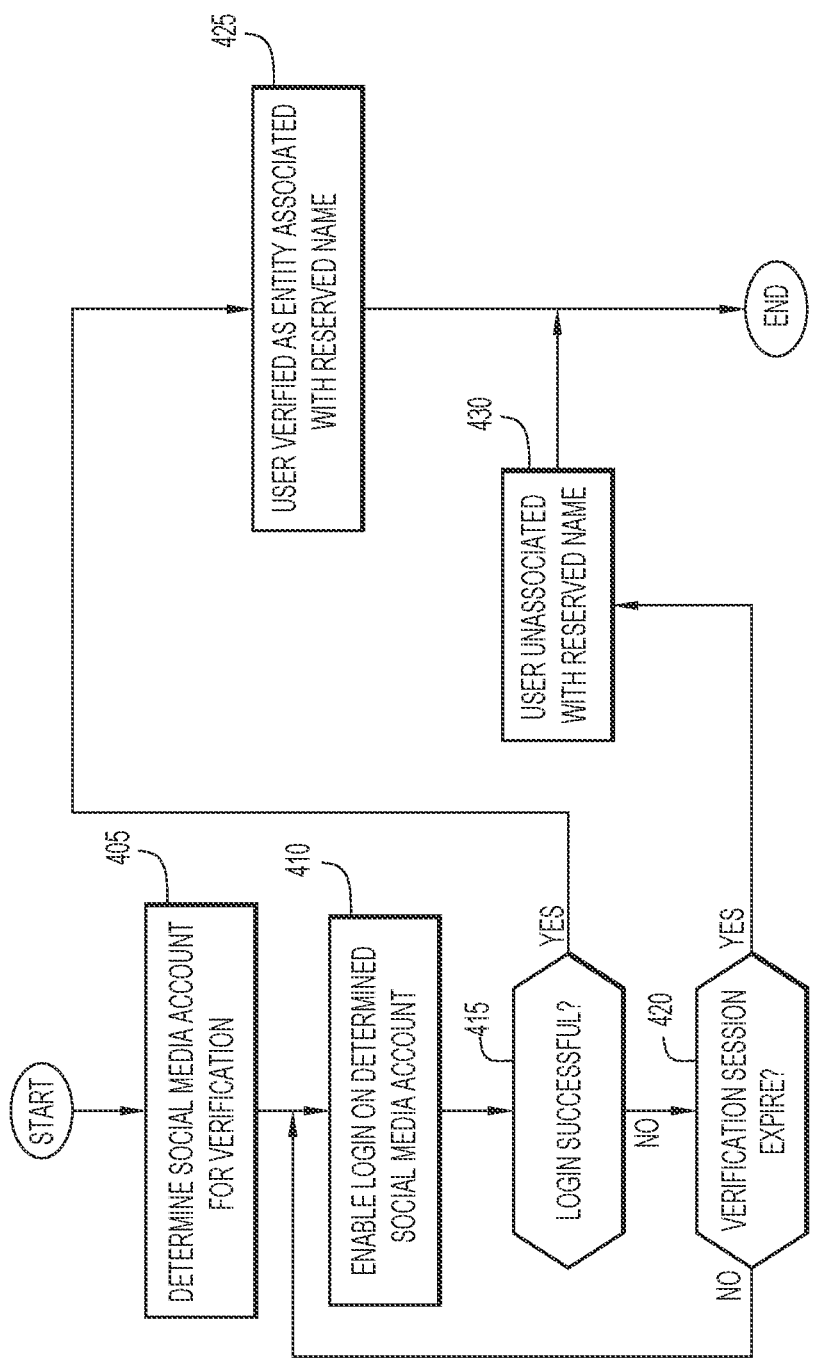
FIG. 4 is a flowchart of a manner of verifying a user for registering a domain name corresponding to a reserved name based on access to a social media or other account of an entity of the reserved name according to an embodiment of the present invention.

A manner of verifying a user for registering a requested domain name corresponding to a reserved name based on access to a social media or other account (e.g., via verification module 120 and server system 110 and/or client system 114) according to an embodiment of the present invention is illustrated in FIG. 4. Initially, registration module 116 of server system 110 determines that the requested domain name corresponds to a reserved name, and identifies social media or other accounts of the entity of the reserved name as described above. Verification module 120 of server system 110 determines the social media or other account to use for verification of the user as corresponding to the entity of the reserved name at operation 405. For example, the registration module may determine one or more social media or other accounts for the entity of the reserved name as described above. When a single account is determined for the entity, that account may be selected for verification. When a plurality of social media or other accounts are determined for the entity, the verification module may select a social media or other account for verification of the user based on various factors. For example, a social media account may be selected based on a time period the social media or other account has been active (e.g., the oldest active account, etc.), where older active social media or other accounts indicate greater trust of the identity of the entity of the reserved name.

Further, a social media or other account may be selected based on an amount of followers, connections, or other linked accounts (e.g., greatest amount of followers, connections, or other linked accounts, etc.), where a greater number of followers, connections, or other linked accounts indicates greater trust of the identity of the entity of the reserved name. In addition, a social media or other account may be selected based on an amount of posts (e.g., greatest amount of posts, etc.), where a greater number of posts indicates greater trust of the identity of the entity of the reserved name. Thus, the social media or other account used for verification dynamically changes based on the requested domain name and entity of a corresponding reserved name. In other words, the identity and account for verification is determined and selected based on association with the entity of the reserved name, as opposed to the identity and account being provided by an unknown user for verification.

Once the social media or other account is selected, verification module 120 enables the user to log in or access the selected account at operation 410. The verification module may provide a link on the user interface of client system 114 to enable the user to log in or access the selected account. For example, the link may direct the user to a general login of the social media or other network service, where the user needs to enter the username and password for the selected account. Alternatively, the link may direct the user to a specific login for the selected account, where the user needs to enter the password. The verification module listens for the response to the user login or access. This may be accomplished via any conventional or other mechanisms (e.g., Open Authorization (OAuth) protocol, etc.). For example, the entity may provide authorization for the social media or other network site to provide certain information pertaining to the selected account to the verification module. In response to the authorization, the verification module may request a token from an authorization server based on proof of identity. The token is used by verification module 120 to access the information of the selected account from the social media or other network site to detect a successful login or access. This enables the verification module to access the selected account of the social media or other network site without receiving sensitive information (e.g., user name, passwords, etc.).

The login or access process is repeated until the user login or access is successful or a verification session has expired as determined at operations 415 and 420. The verification session may be based on a maximum number of login or access attempts and/or a predetermined time interval (or timeout). The maximum number of login or access attempts may be a predetermined number, and preferably in a range of one through five. However, any number of login or access attempts may be used. Moreover, verification module 120 may set a time interval (or timeout) for a successful log in or access. The time interval is preferably in a range of one through five minutes, but any time interval may be utilized. When a successful log in or access has not occurred prior to attaining the maximum number of login or access attempts and/or prior to the expiration of the time interval, the user verification is unsuccessful.

When a successful login or access has not occurred prior to expiration of the verification session as determined at operation 420, the user verification fails and the user is determined not to be associated with the reserved name at operation 430. In other words, the user fails to be verified as having authority to register the requested domain name. Registration module 116 may perform various actions in response to this determination including denying registration, providing notice, and/or directing the user to perform the manual verification process as described above.

When the response to the user login or access indicates a successful login or access prior to expiration of the verification session as determined at operation 415, the user is determined to be associated with the reserved name at operation 425. In other words, the user is verified as the entity having authority to register the requested domain name. Registration module 116 may proceed to register the requested domain name in response to this determination as described above.

In addition, once a user is logged in or accessing an account of a social media or other network site (e.g., via the verification, a separate log in or access, etc.), registration module 116 may receive information and analyze the site to identify potential names for domain name registration (e.g., user handle or user identification, etc.). Since the account may be verified by a verification process of the social media or other network site as described above, the user is verified as the actual entity. The potential names may be checked for availability for domain name registration in substantially the same manner described above, and presented to the user for registration in response to the availability. Further, the registration module may transform the potential names into available domain names based on the availability determination for consideration by the user for registration. In other words, the domain name registration may be initiated from the social media or other network account.

Figure 5:
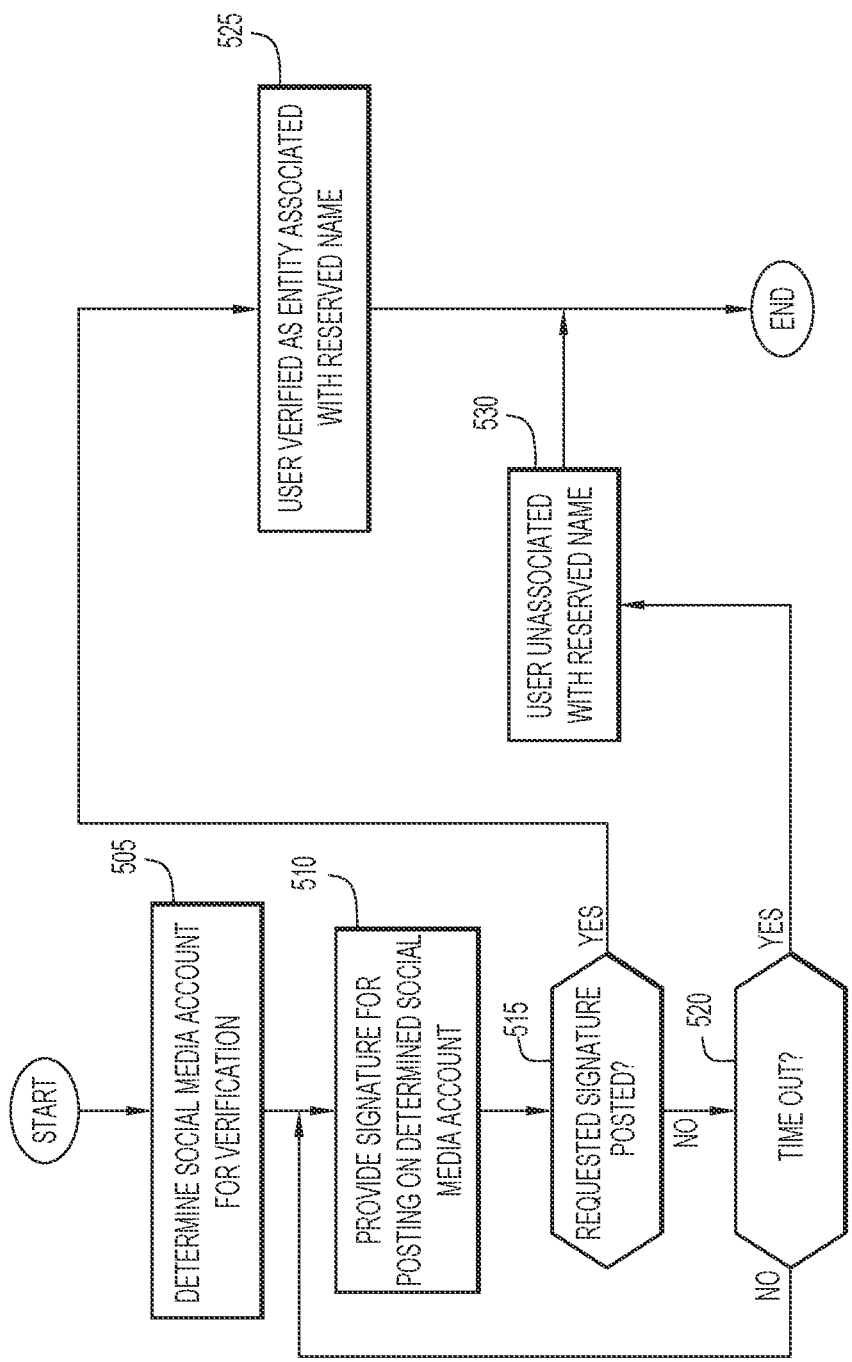
FIG. 5 is a flowchart of a manner of verifying a user for registering a domain name corresponding to a reserved name based on posting information to a social media or other account of an entity of the reserved name according to an embodiment of the present invention.

A manner of verifying a user for registering a requested domain name corresponding to a reserved name based on posting information to a social media or other account (e.g., via verification module 120 and server system 110 and/or client system 114) according to an embodiment of the present invention is illustrated in FIG. 5. Initially, registration module 116 determines that the requested domain name corresponds to a reserved name, and identifies social media or other accounts of the entity of the reserved name as described above. Verification module 120 determines the social media or other account to use for verification of the user at operation 505. For example, the registration module may determine one or more social media or other accounts for the entity of the reserved name as described above. When a single account is determined for the entity, that account may be selected for verification.

When a plurality of social media or other accounts are determined for the entity, the verification module 120 may select a social media or other account for verification of the user based on various factors as described above. For example, a social media or other account may be selected based on a time period the social media or other account has been active (e.g., the oldest active account, etc.), where older active social media or other accounts indicate greater trust of the identity of the entity of the reserved name. Further, a social media or other account may be selected based on an amount of followers, connections, or other linked accounts (e.g., greatest amount of followers, connections, or other linked accounts, etc.), where a greater number of followers, connections, or other linked accounts indicates greater trust of the identity of the entity of the reserved name. In addition, a social media or other account may be selected based on an amount of posts (e.g., greatest amount of posts, etc.), where a greater number of posts indicates greater trust of the identity of the entity of the reserved name. Thus, the social media or other account used for verification dynamically changes based on the requested domain name and entity of a corresponding reserved name. In other words, the identity and account for verification is determined and selected based on association with the entity of the reserved name, as opposed to the identity and account being provided by an unknown user for verification.

Once the social media account is selected, verification module 120 provides information to the user for posting to the selected social media or other account of the entity of the reserved name at operation 510. By way of example, the information preferably includes a signature or code including any quantity of alphanumeric or other characters, symbols, and/or numerals. However, the information may include any desired information (e.g., a message, a signature or code, etc.). The information may be generated and provided to the user in any desired fashion. For example, the signature may be randomly generated, based on hashing or encryption, incremental numbers, etc. The information may be provided to the user on the user interface of client system 114, or sent to the user in an electronic message (e.g., email, text message, etc.).

Verification module 120 may provide a link on the user interface of client system 114 to enable the user to log in or access the selected account and post the signature. For example, the link may direct the user to a general login of the social media or other network service, where the user needs to enter the username and password for the selected account. Alternatively, the link may direct the user to a specific login for the selected account, where the user needs to enter the password. The post may further include an identifier pertaining to the domain name registration to indicate the post as the verification. The login or access and detection of the posting of the signature may be accomplished via any conventional or other mechanisms (e.g., Open Authorization (OAuth) protocol, etc.). For example, the entity may provide authorization for the social media or other network site to provide certain information pertaining to the selected account to the verification module. In response to the authorization, the verification module may request a token from an authorization server based on proof of identity. The token is used by verification module 120 to access the information of the selected account from the social media or other network site in substantially the same manner described above to detect a successful login or access to the selected account and posting of the signature. This enables the verification module to access the social media or other account of the entity without receiving sensitive information (e.g., user name, passwords, etc.).

Alternatively, verification module 120 may access an account of the social media or other network site that is linked to the selected account for the entity in order to view postings of the entity account. In this case, the verification module may further provide an indicator of the linked account to be included in the posting of the signature. The user may log in or access the selected account for the posting in any fashion (e.g., another session, window, or tab of the interface module 122 (or browser), etc.).

Verification module 120 monitors the social media or other account of the entity of the reserved name for the post at operation 515. The verification module may detect the identifier of a post as corresponding to the verification. In this case, the verification module compares the posted signature to the signature provided to the user. When the posted signature matches the signature provided to the user, the verification is successful.

Verification module 120 monitors the selected account until a successful verification of a posted signature is detected or a time out has occurred (e.g., a predetermined time interval has expired) as determined at operations 515 and 520. The time out may be a predetermined amount of time suitable to enable the user to the post the signature, and preferably in a range from one through five minutes. However, any time period may be used as the time out interval.

When the time out occurs (e.g., the predetermined time interval expires, etc.) without detecting a successful verification of a posted signature as determined at operation 520, the user verification fails. For example, a correct signature may not have been posted prior to expiration of the time interval for the time out. Accordingly, the user is determined not to be associated with the reserved name at operation 530. In other words, the user fails to be verified as having authority to register the requested domain name. Registration module 116 may perform various actions in response to this determination including denying registration, providing notice, and/or directing the user to perform the manual verification process as described above.

When the verification module detects successful verification of a posted signature prior to occurrence of the timeout (e.g., expiration of the predetermined time interval, etc.) as determined at operation 515, the user is determined to be associated with the reserved name at operation 525. In other words, the user is verified as the entity having authority to register the requested domain name. Registration module 116 may proceed to register the requested domain name in response to this determination as described above.

Figure 6:
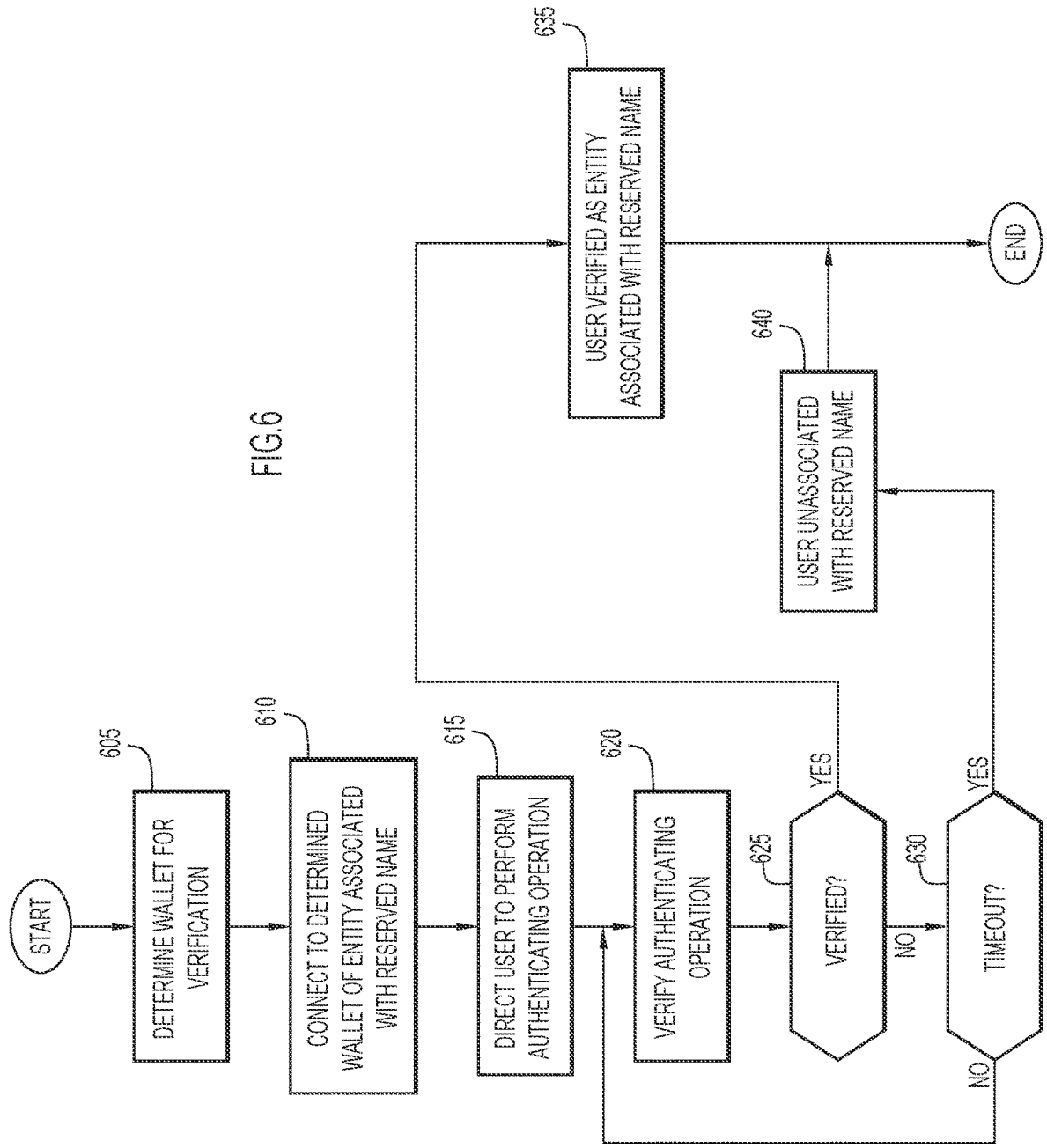
FIG. 6 is a flowchart of a manner of verifying a user for registering a domain name corresponding to a reserved name based on verification of a wallet of an entity of the reserved name according to an embodiment of the present invention.

A manner of verifying a user for registering a requested domain name corresponding to a reserved name based on a wallet of an entity of the reserved name (e.g., via verification module 120 and server system 110 and/or client system 114) according to an embodiment of the present invention is illustrated in FIG. 6. Initially, registration module 116 of server system 110 determines that the requested domain name corresponds to a reserved name, and identifies social media or other accounts (e.g., electronic or other wallets, etc.) of the entity of the reserved name as described above. Verification module 120 of server system 110 determines the wallet to use for verification of the user as corresponding to the entity of the reserved name at operation 605. For example, the registration module may determine one or more wallets for the entity of the reserved name as described above. When a single wallet is determined for the entity, that wallet may be selected for verification. When a plurality of wallets are determined for the entity, the verification module may select a wallet for verification of the user based on various factors (e.g., most activity or transactions, most recent activity or transaction, wallet with greatest value of assets, etc.).

Verification module 120 requests the user to access the selected wallet associated with the entity of the reserved name at operation 610, and to perform an operation to authenticate the user at operation 615. By way of example, the verification module may send a message to the selected wallet of the entity of the reserved name for the user to sign. This may be accomplished via an add-on or plug-in applied to interface module 122 (e.g. a browser, etc.).

The user logs in or otherwise accesses the selected wallet (e.g., via a user name and password, etc.) in order to sign the message and verify the user as the entity of the reserved name. Verification module 120 monitors the selected wallet for verification of the authenticating operation at operation 620 until a successful verification of the authenticating operation is detected or a time out has occurred (e.g., a time interval has expired) as determined at operations 625 and 630. The time out may be a predetermined time interval sufficient to enable the user to perform the authenticating operation, and preferably in a range from one through five minutes. However, any time interval may be used for the time out.

By way of example, signing of the message in the selected wallet of the entity of the reserved name generates a digital signature of the message based on the private key of the wallet. The signed message or digital signature is decrypted for verification (e.g., by the add-on or plug-in of interface module 122) based on the public key (e.g., blockchain address, etc.) corresponding to the selected wallet. Since the private key is unique to the selected wallet (or entity of the reserved name), successful decryption of the message with the corresponding public key verifies the message was sent by the entity of the reserved name. A response may be provided to the verification module (e.g., from the add-on or plug-in of interface module 122) indicating a result of the decryption of the signed message.

When the time out occurs (e.g., the predetermined time interval expires, etc.) without detecting a successful verification of the authenticating operation as determined at operation 630, the user verification fails. For example, the signed message may have failed the message verification (e.g., based on the response from the add-on or plug-in of interface module 122), or the user was unable to access the wallet of the entity to sign the message prior to occurrence of the timeout (e.g., expiration of the predetermined time interval, etc.). Accordingly, the user is determined not to be associated with the reserved name at operation 640. In other words, the user fails to be verified as the entity having authority to register the requested domain name. Registration module 116 may perform various actions in response to this determination including denying registration, providing notice, and/or directing the user to perform the manual verification process as described above.

When the verification is successful (e.g., based on the response from the add-on or plug-in of interface module 122) prior to occurrence of the timeout (e.g., expiration of the predetermined time interval, etc.) as determined at operation 625, the user is determined to be associated with the reserved name at operation 635. In other words, the user is verified as the entity having authority to register the requested domain name. Registration module 116 may proceed to register the requested domain name in response to this determination as described above.

In addition, a successful wallet verification for the user may be used as verification for other requests by the user for registration of corresponding domain names (e.g., without repeating the verification process for the user, etc.). For example, the wallet verification may be performed in substantially the same manner described above for registration of a requested domain name corresponding to a reserved name, and/or for authentication of the user during a login process or access of an account of a network site (e.g., domain name registration account, social media account, etc.). The wallet and/or account may indicate one or more previous domain name registrations of the user.

When the user requests registration of another domain name that is determined to correspond to a reserved name, the other domain name is compared to the previous domain name registrations to determine a previous domain name registration corresponding to the other domain name (e.g., a previous domain name registration corresponding to the same reserved name as the other domain name, etc.). When a corresponding previous domain name registration is identified, this means that the user has already been verified with respect to the reserved name. Accordingly, the verification of the user for the corresponding previous domain name registration serves as verification that the user corresponds to the entity of the reserved name corresponding to the other domain name. Thus, registration of the other domain name may commence without repeating the verification process for the user.

By way of example, a domain name that corresponds to a previously registered domain name may include a domain name that is requested to be registered for a different extension (e.g., the user requests registration of a domain name of "name.e2" when the user has previously registered the domain name of "name.e1", etc.). Further, a domain name that includes the name portion of the previously registered domain name with a prefix or suffix may correspond to the previously registered domain name (e.g., the user requests registration of a domain name of "name1. e1" when the user has previously registered the domain name of "name.e1", etc.).

However, a successful verification of the user for registering a domain name corresponding to a reserved name (e.g., by the verification processes described herein, other verification processes, etc.) may be used as verification for registration of corresponding domain names associated with that reserved name (e.g., without repeating the verification process for the user, etc.) in substantially the same manner described above.

Figure 7:
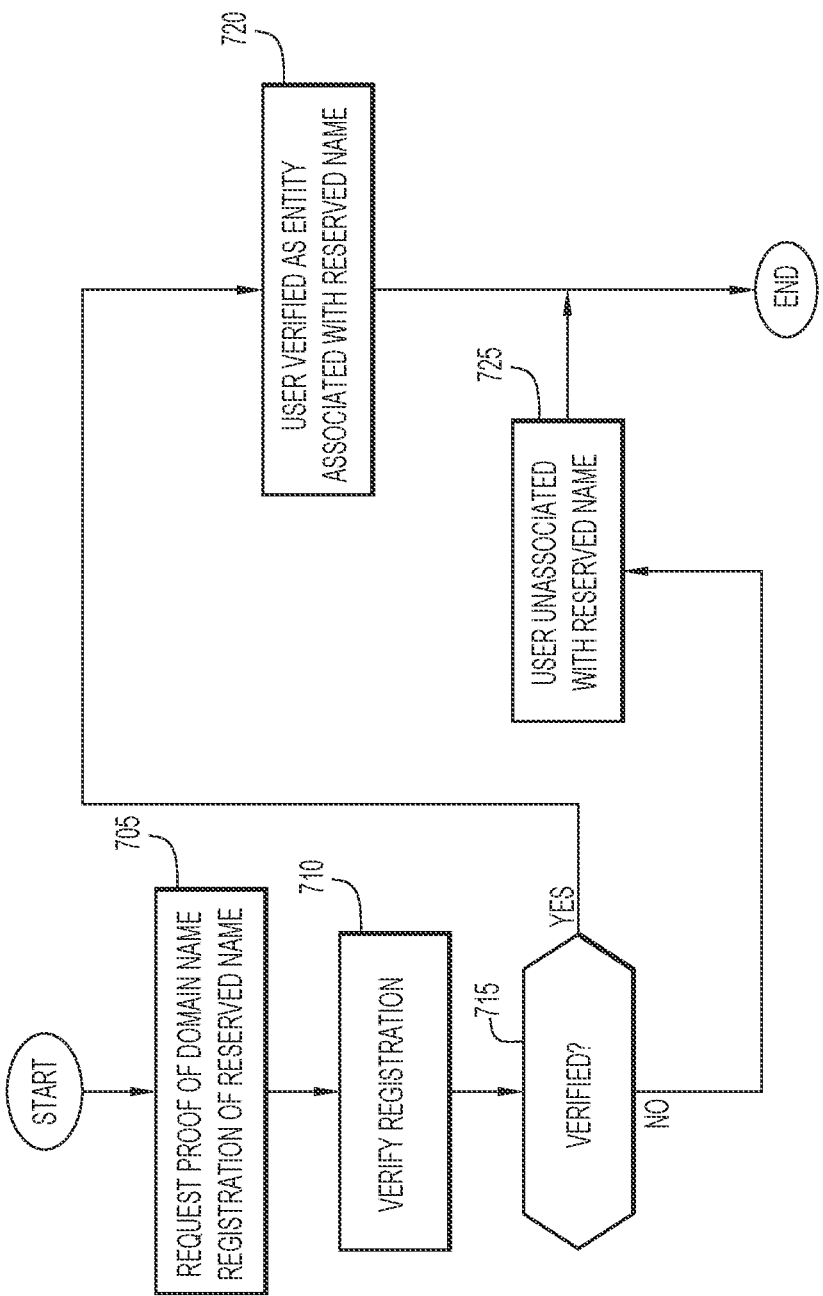
FIG. 7 is a flowchart of a manner of verifying a user for registering a domain name corresponding to a reserved name based on proof of registration of the reserved name as a domain name of another domain based system according to an embodiment of the present invention.

A manner of verifying a user for registering a requested domain name corresponding to a reserved name based on proof of registration of the reserved name as a domain name of another domain based system (e.g., via verification module 120 and server system 110 and/or client system 114) according to an embodiment of the present invention is illustrated in FIG. 7. Initially, a reserved name may be a registered domain name of another domain based system. In this case, an entity of the reserved name may obtain proof of the registration. The proof of the registration may be in the form of a file bound to the entity (e.g., .txt, .html, etc.) that is obtained from a domain name registration provider (e.g., by accessing a corresponding account of the entity). The file contains specific content pertaining to the registration.

Alternatively, the proof of the registration may be in the form of a Domain Name System (DNS) or other record that may be added or modified by the entity on the system hosting the domain. For example, Domain Name System (DNS) creates a set of one or more records when a domain name is registered. By way example, the records may include records of one or more record types including an address (or A) record, a hostname pointing (or CNAME alias) record, a mail (or MX) record, a name server record, a private name server record, a text (or TXT/SPF) record, and a service (or SRV) record. The entity of the reserved name may insert information into an existing record, or add a new record with the information (e.g., by accessing a corresponding account of the entity).

Verification module 120 requests proof of the registration from the user at operation 705. The user attempts to obtain the file and upload the file to the system hosting the domain (e.g., by logging in or accessing the corresponding entity account (e.g. via a user name and password, etc.), etc.). The file is preferably uploaded to a root or other directory of the web site of the domain.

In the case of a Domain Name System (DNS) or other record, verification module 120 may provide a message or setting to the user for insertion into an existing record (e.g., text or other record) or a new record (e.g., text or other record) to be added by the user. The message or setting may include any quantity of alphanumeric or other characters, symbols, and/or numerals. The message or setting may be provided to the user in any desired fashion. For example, the message or setting may be provided to the user on the user interface of client system 114, or sent to the user in an electronic message (e.g., email, text message, etc.). The user attempts to insert the message or setting into an existing record or add a new record with the message or setting (e.g., by logging in or accessing the corresponding entity account (e.g., via user name and password, etc.), etc.).

Verification module 120 verifies the file or record at operation 710. For example, the verification module may check and compare the presence, content, and/or attributes of the file (e.g., filename, content relative to another version of the file, location, timestamp (e.g., to ensure a recent file), etc.) to file reference information to verify the file. The file reference information includes valid information for the file (e.g., proper filename, content of a valid version, appropriate location, time period or age for the file (e.g., minutes, hours, days, etc.), etc.). Further, the verification module may check and compare the presence, content, and/or attributes of the record (e.g., record type, message or setting, timestamp (e.g., to ensure a recent record, etc.), etc.) to record reference information to verify the record. The record reference information includes valid information for the record (e.g., proper record type, proper message or setting, time period or age for record (e.g., minutes, hours, days, etc.), etc.).

When the verification fails as determined at operation 715, the user is determined not to be associated with the reserved name at operation 725. For example, the file or record was not present, or the content and/or one or more attributes of the file or record did not comply with the associated reference information (e.g., incorrect filename or record type, incorrect message, the file or record is older than the time period or age, etc.). The failed verification indicates the user was not verified as the entity having authority to register the requested domain name. Registration module 116 may perform various actions in response to this determination including denying registration, providing notice, and/or directing the user to perform the manual verification process as described above.

When the verification is successful (e.g., the file or record was present and the content and/or one or more attributes complied with the associated reference information) as determined at operation 715, the user is determined to be associated with the reserved name at operation 720. In other words, the user is verified as the entity having authority to register the requested domain name. Registration module 116 may proceed to register the requested domain name in response to this determination as described above.

In addition, verification module 120 may provide a number of attempts and/or a predetermined time interval for producing the proof of registration. When the proof of registration is not provided within the number of attempts and/or the predetermined time interval, verification of the user fails as described above. The number of attempts may be any desired amount, preferably one through five. Similarly, the predetermined time interval may be any time interval, preferably in the range of one through five minutes.

Figure 8:
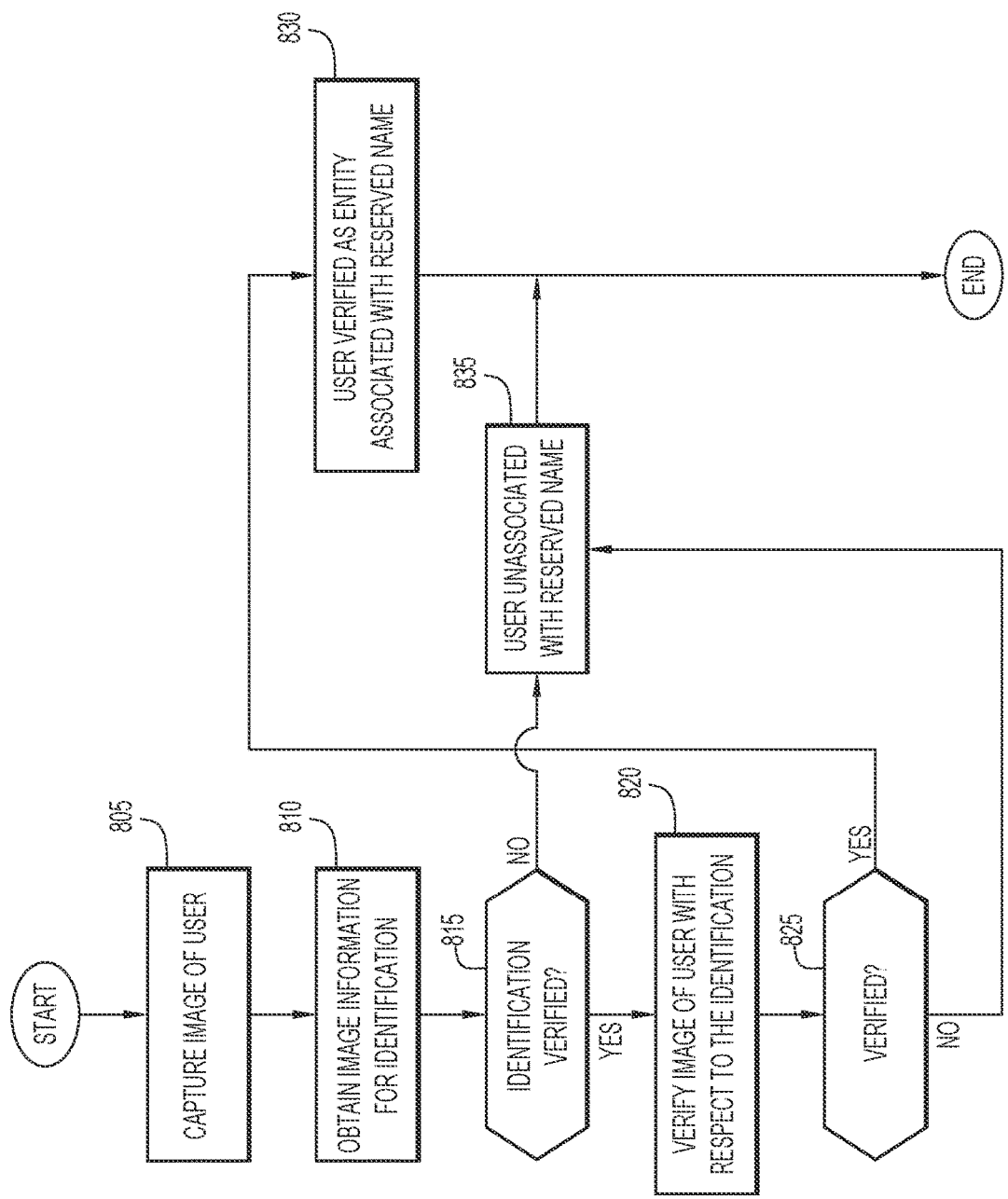
FIG. 8 is a flowchart of a manner of verifying a user for registering a domain name corresponding to a reserved name based on biometrics according to an embodiment of the present invention.

A manner of verifying a user for registering a requested domain name corresponding to a reserved name based on biometrics through a Know Your Customer (KYC) or Identity Verification type method (e.g., via verification module 120 and server system 110 and/or client system 114) according to an embodiment of the present invention is illustrated in FIG. 8. Initially, verification module 120 directs client system 114 of the user to capture an image of the user, preferably including a face of the user at operation 805. This may be accomplished by controlling image capture device 235 of the client system to capture the image.

Verification module 120 further directs client system 114 to obtain image formation for an identification provided by the user at operation 810. The identification is preferably a government or other officially issued identification (e.g. driver's or other license, passport, etc.) including an image of a corresponding person, and is provided by the user for the image capture (e.g., in possession of the user, etc.). This may be accomplished by controlling image capture device 235 of the client system to capture an image of the identification. Alternatively, image information for the identification (e.g., an image of a person corresponding to the identification, etc.) may be obtained from a memory device of the identification.

Verification module 120 may initially verify the identification at operation 815. For example, natural language processing and/or other techniques (e.g., optical character recognition (OCR), etc.) may be employed to extract the name from the identification and determine that the extracted name matches the entity of the reserved name. Further, conventional or other image analysis techniques may be employed to identify markings indicating authenticity of the identification (e.g., watermarks, codes, etc.). The name for the identification and authenticity information may alternatively be provided from a memory device of the identification. The biometric verification may proceed when the identification has been verified. When the identification does not match the entity of the reserved name, or is determined to not be authentic, the user may be requested to provide another identification. When a proper identification is not provided (e.g., within a predetermined number of attempts or a predetermined time interval, etc.), verification of the user fails and the user is determined not to be associated with the reserved name at operation 835 as described below. The predetermined number of attempts may be any desired amount, preferably one through five. Similarly, the predetermined time interval may be any time interval, preferably in the range of one through five minutes.

When the identification has been verified as determined at operation 815, the image of the user is compared with the image for the identification to verify the user against the identification at operation 820. This may be accomplished by any conventional or other image processing techniques (e.g., facial recognition techniques, etc.). For example, the faces of persons may be detected within each of these images, and the corresponding pixels compared. A combination of the pixel differences (e.g., sum or weighted sum of the differences between values of corresponding pixels in the images, etc.) may be compared to a difference threshold. When the combination of the pixel differences satisfies the difference threshold (e.g., the difference between the images is sufficiently low, etc.), the user is considered to correspond to the identification.

Alternatively, feature vectors may be extracted from each of the images. A feature vector may include any suitable features (e.g., person features/dimensions, pixel features, pixel intensity, etc.). A conventional or other distance (e.g., cosine similarity, etc.) between the feature vectors may be determined and compared to a distance threshold. When the determined distance satisfies the distance threshold (e.g., the difference between the captured images is sufficiently low, etc.), the user is considered to correspond to the identification.

In addition, a machine learning model may be used to perform the image comparison. The machine learning model may be implemented by any conventional or other machine learning models (e.g., mathematical/statistical, classifiers, feed-forward, recurrent, convolutional or other neural networks, etc.). For example, neural networks may include an input layer, one or more intermediate layers (e.g., including any hidden layers), and an output layer. Each layer includes one or more neurons, where the input layer neurons receive input (e.g., image data, feature vectors of images, etc.), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the machine learning of the neural network may be performed using a training set of images as input and corresponding classifications as outputs, where the neural network attempts to produce the provided output (or classification) and uses an error from the output (e.g., difference between produced and known outputs) to adjust weight (and bias) values (e.g., via backpropagation or other training techniques).

In this example case, the machine learning may be performed using a training set of image information for different persons (e.g., images of persons and images for identifications) as input and known corresponding classifications (e.g., correspondence or non-correspondence) as output, where the neural network attempts to produce the provided output (or correspondence or non-correspondence classification). In an embodiment, the different combinations of images of persons and images for identifications may be used for the training set as input, while the corresponding known classifications (correspondence or non-correspondence) may be used for the training set as known output. In an embodiment, feature vectors may be extracted from the images and used for the training set as input, while the corresponding known classifications may be used for the training set as known output. A feature vector may include any suitable features (e.g., person features/dimensions, pixel features, etc.).

The output layer of the neural network indicates a classification (e.g., correspondence or non-correspondence, etc.) for input data. By way of example, the classes used for the classification may include a class associated with each of a correspondence and non-correspondence (e.g., indicating whether the images correspond to a same entity, etc.). The output layer neurons may provide a classification that indicates a presence of a correspondence or non-correspondence when images of a person and for an identification are within input data. Further, output layer neurons may be associated with the different classes, and indicate a probability for the input data being within a corresponding class (e.g., probabilities of a correspondence and a non-correspondence, etc.). The class or identity associated with the highest probability is preferably selected as the class or result for the input data. The image of the user and the image for the identification are provided to the neural network, where the neural network indicates whether the user corresponds to the identification. For example, a resulting classification of correspondence indicates the user corresponds to the identification, and a resulting classification of non-correspondence indicates the user does not correspond to the identification.

When the user does not correspond to the identification as determined at operations 815 or 825, the verification fails and the user is determined not to be associated with the reserved name at operation 835. The failed verification indicates the user was not verified as the entity having authority to register the requested domain name. Registration module 116 may perform various actions in response to this determination including denying registration, providing notice, and/or directing the user to perform the manual verification process as described above.

When the verification is successful (e.g., the user corresponds to the identification) as determined at operation 825, the user is determined to be associated with the reserved name at operation 830. In other words, the user is verified as the entity having authority to register the requested domain name. Registration module 116 may proceed to register the requested domain name in response to this determination as described above.

Further, verification module 120 may obtain various other user biometrics (e.g., fingerprints, iris patterns, etc.) and compare them to a government or other official identification in substantially the same manner described above. Verification module 120 may direct image capture device 235 to capture images of one or more other user biometrics (e.g., iris pattern, fingerprint, etc.). Alternatively, the verification module may direct a fingerprint scanner and/or eye scanner coupled to a client system to capture images of user fingerprints and/or iris patterns.

Moreover, verification module 120 may obtain image information of one or more biometrics for the identification. For example, the verification module may direct image capture device 235 to capture an image of the identification, where the identification includes images of the one or more biometrics (e.g., fingerprints, iris patterns, etc.). In addition, the images of the one or more biometrics (e.g., fingerprints, iris patterns, etc.) may be obtained from a memory device of the identification.

The images of the user biometrics may be compared to the images of biometrics for the identification based on image analysis techniques substantially similar to those described above. When one or more of the biometrics of the user are sufficiently similar to one or more corresponding biometrics of the identification, the user corresponds to the entity of the reserved name in substantially the same manner described above.

Further, the machine learning model described above may be trained using image information for different persons (e.g., images of person biometrics (e.g., fingerprints, iris patterns, etc.) and images of biometrics for identifications) to be recognized as input and known corresponding classifications (e.g., correspondence or non-correspondence) as output, where the neural network attempts to produce the provided output (or correspondence or non-correspondence classification). In an embodiment, the different combinations of images of person biometrics and images of biometrics for identifications may be used for the training set as input, while the corresponding known classifications (correspondence or non-correspondence) may be used for the training set as known output. In an embodiment, feature vectors may be extracted from the images and used for the training set as input, while the corresponding known classifications may be used for the training set as known output. A feature vector may include any suitable features (e.g., person features/dimensions, pixel features, etc.).

The output layer neurons provide a classification that indicates a presence of a correspondence or non-correspondence when an image of a person biometric and an image of a biometric for an identification are within input data as described above. Further, output layer neurons may be associated with the different classes, and indicate a probability for the input data being within a corresponding class (e.g., probabilities of a correspondence and a non-correspondence, etc.). The class associated with the highest probability is preferably selected as the class or result for the input data. The image of a user biometric (e.g., fingerprint, iris pattern, etc.) and the corresponding image for the identification are provided to the neural network, where the neural network indicates whether the user biometric corresponds to the identification. For example, a resulting classification of correspondence indicates the user biometric corresponds to the biometric for the identification (or entity of the reserved name), and a resulting classification of non-correspondence indicates the user biometric does not correspond to the biometric for the identification (or entity of the reserved name). The user may be determined to correspond to the entity of the reserved name when any quantity of biometrics (e.g., one or more biometrics, etc.) are determined by the neural network to correspond.

Figure 9:
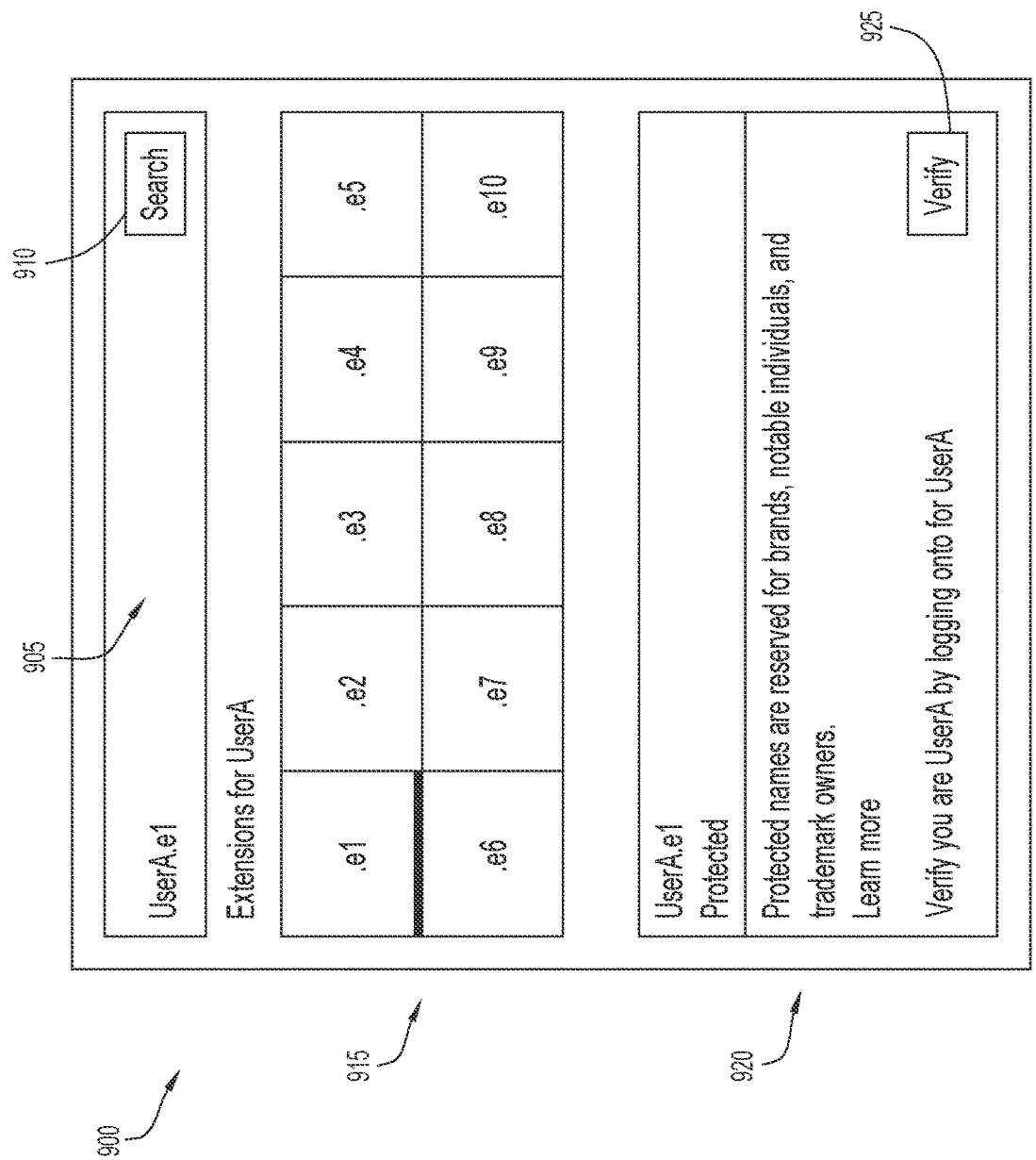
FIG. 9 is a schematic illustration of an example graphical user interface for verifying a user for registering a domain name corresponding to a reserved name according to an embodiment of the present invention.
Figure 10:
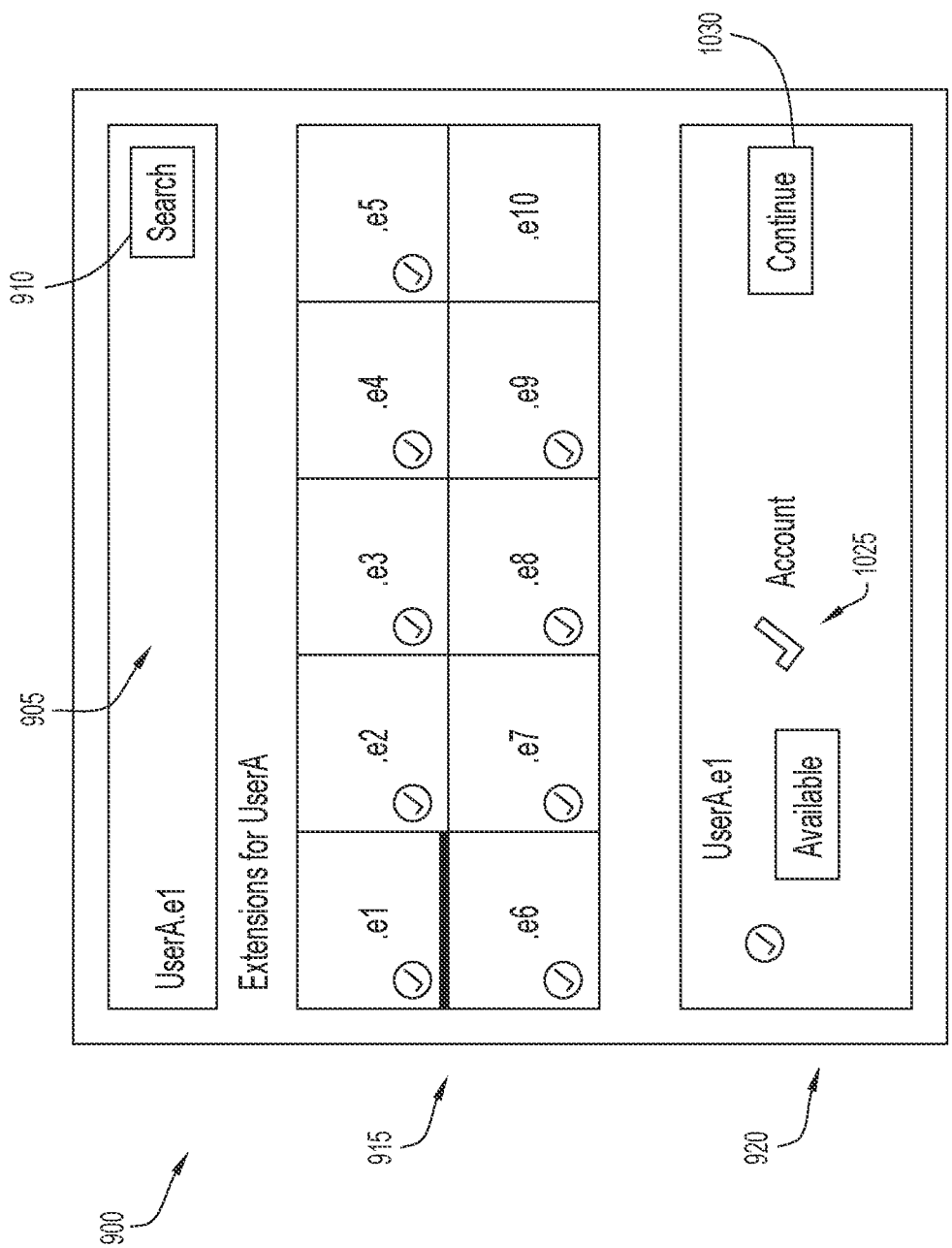
FIG. 10 is a schematic illustration of the example graphical user interface of FIG. 9 indicating verification of the user for registration of the domain name corresponding to the reserved name according to an embodiment of the present invention.

An example scenario for domain name registration according to an embodiment of the present invention is illustrated in FIGS. 9-10. Initially, user interface 900 is displayed on a client system 114 to initiate registration of a domain name. User interface 900 includes a search field 905 disposed toward an upper portion of the user interface, a selection field 915 disposed below the search field indicating various extensions (e.g., .e1 through .e10 as viewed in FIG. 9), and a verification area 920 disposed below the selection field. By way of example, User A is a noteworthy person, and desires to register the domain name "UserA.e1". User A enters the domain name in search field 905, and the ".e1" extension is initially selected in selection field 915. User A actuates a search link 910 adjacent search field 905 to commence a search to determine availability and correspondence to a reserved name in substantially the same manner described above.

In response to the search, user interface 900 displays an error message in verification area 920 indicating that the requested domain name is reserved. Verification area 920 provides a further message that the requested domain name may be unlocked by verifying that User A is the owner of a corresponding social media account using the reserved name, and provides a verify actuator 925 to log in to the corresponding account. The social media account may include TWITTER, FACEBOOK, INSTAGRAM, PINTEREST, DISCORD, TELEGRAM, YOUTUBE, SNAPCHAT, WHATSAPP, etc. User A actuates the verify actuator to perform the verification process in substantially the same manner described above for FIG. 4.

Once verified, user interface 900 indicates availability of the requested domain name for extensions in selection field 915 (e.g., via a checkmark or other indicator adjacent an extension) as illustrated in FIG. 10. In addition, a verification icon 1025 may be shown adjacent an account indicator within verification area 920 to indicate verification of the user during the registration process. User A may actuate a continue actuator 1030 to proceed to complete registration of the domain name in substantially the same manner described above.

Present invention embodiments may provide various technical and other advantages. For example, present invention embodiments provide a domain name registration with various enhanced security aspects. For example, the generation and storage of the non-fungible token (NFT) in a user wallet provides self-custody over the domain name and enables universal verification of the domain name via the blockchain. In other words, the user wallet enables the user to have sole control of the domain name to perform operations that alter content and/or functionality for the domain name, thereby enhancing security for the domain. Further, the domain name provides universal verification of the domain and user via the wallet.

Moreover, present invention embodiments provide immediate verification of a user as an authorized entity to proceed with a registration in order provide enhanced security for domain access. The verification prevents registration of similar names that may attract and direct network traffic to malicious network sites, thereby causing unnecessary traffic and reducing network bandwidth. Further, present invention embodiments may rely on or use verification by the social media or other accounts of the entity to verify the user (e.g., based on the user login, posting, etc.). This avoids significant amounts of processing, conserves processing and memory resources, and provides a rapid user verification. Moreover, present invention embodiments may rely on a prior verification used for registration of a domain name associated with a same or similar reserved name. In this case, domain name registration may proceed without performing the verification process, thereby avoiding significant amounts of processing, conserving processing and memory resources, and providing rapid registration.

In addition, the machine learning model for biometric verification described above may be continuously updated (or trained) based on feedback related to a prior verification (e.g., based on access to an account of the entity of a reserved name as described above, etc.). For example, the neural network may indicate a user corresponds to a biometric for the identification (e.g., with a lower confidence or probability). However, the prior verification may indicate that the user does correspond to the entity. Further, the neural network may indicate a user does not correspond to a biometric for the identification (e.g., with a lower confidence or probability), where the prior verification may indicate the user does not correspond. In addition, the neural network may produce a result inconsistent with the prior verification.

In these types of cases, the machine learning model may be updated (or trained) based on the prior verification. By way of example, the image information for the user and for the identification may be used to update or train the machine learning model (e.g., update or train the machine learning model to increase the probability for and/or change a resulting classification, etc.). For example, the probability for a resulting classification (correspondence or non-correspondence) may be increased when the results of the neural network are consistent with the prior verification. Further, the resulting classification (correspondence or non-correspondence) and/or corresponding probability may be changed when the results of the neural network are inconsistent with the prior verification. Thus, the machine learning model may continuously evolve (or be trained) to compare biometrics of the user and for the identification as the comparisons are being performed.

It will be appreciated that the embodiments described above and illustrated in the drawings represent only a few of the many ways of implementing embodiments for domain name registration based on verification of entities of reserved names. In addition, characteristics or features of embodiments of the present invention may be combined in any fashion to provide additional embodiments of the present invention.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, hand-held devices, smartphones or other mobile devices, etc.), and may include any commercially available operating system and any combination of commercially available and custom software (e.g., communications software; server software; software of present invention embodiments (including registration module 116, verification module 120, interface module 122, etc.), etc.). These systems may include any types of monitors and input devices (e.g., keyboard, mouse, voice recognition, etc.) to enter and/or view information.

It is to be understood that the software of the present invention embodiments (e.g., registration module 116, verification module 120, interface module 122, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., registration module 116, verification module 120, interface module 122, etc.) may be available on a non-transitory computer useable or readable medium (e.g., magnetic or optical mediums, magneto-optic mediums, CD-ROM, DVD, memory devices, etc.) of a stationary or portable computer program product, apparatus, or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., domain name registrations, mappings of users to social media or other accounts, etc.). The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., domain names requested for registration, results of registration, reserved names, results of verification, etc.), where the interface may include any information arranged in any fashion. The interface may include any number of any types of input or actuation mechanisms (e.g., buttons, icons, fields, boxes, links, etc.)

disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., results of registration, reserved names, results of verification, etc.).

The present invention embodiments are not limited to the specific tasks or algorithms described above, but may be utilized for verifying users for any type of registration (e.g., domain name, protection, etc.).

The various names (e.g., reserved name, domain name, etc.) may have any form or format, and may include any quantity of terms, words, tokens, or arrangements of any quantity of elements (e.g., alphanumeric or other characters, symbols, numbers, etc.). The domain name registries may include any registry, directory, listing, or other structure of any format containing registered domain names. Availability may be determined by comparing a requested domain name to any quantity of domain name registries in any fashion (e.g., any portion of the requested domain name residing in a registry may indicate unavailability, etc.).

A reserved name may be determined based on a search of any types of data sources for use of the reserved name (e.g., network sites, registries, databases, etc.). A reserved name may be determined by identifying at least one instance of use in any fashion (e.g., any portion of the reserved name may appear in a data source, etc.). The instance of use may be identified based on any conventional or other techniques (e.g., natural language processing (NLP), text analysis for keywords, proximity of text, symbols indicating use (e.g., trademark symbol, web address, etc.), etc.). A reserved name may be determined based on use by a notable individual or organizational entity. A notable individual or organizational entity may be based on an individual characteristic or any combination of characteristics (e.g., a social media or other account with a number of followers, connections, or other linked accounts above a threshold amount, a frequency or amount of activity or postings on a social media or other account above a threshold amount, a social media or other account active for more than a predetermined amount of time, an individual holding an elected or leadership position within a country or organization, an individual with a WIKIPEDIA page, etc.). However, the reserved name may be determined based on use by any entity.

A requested domain name may correspond to a reserved name based on any criteria (e.g., the requested domain name may be a subset or superset of a reserved name, any portion of the reserved name may appear in the requested domain name, any portion of the requested domain name may appear in the reserved name, etc.).

The verification of the user may be based on any quantity or type of accounts of the entity of a reserved name (e.g., social media account, network site account, domain name registration account, service provider account, electronic wallet account, etc.). The verification may detect any type of operation within the account of the entity to verify a user (e.g., a login, post, sign, dummy or other transaction, retrieval of information, etc.). The entity may be an entity owning, using, or otherwise having rights or authority to the reserved name, or an entity having authorization from another entity owning, using, or otherwise having rights or authority to the reserved name.

The verification may select one or more entity accounts to use to verify a user in any fashion (e.g., number of linked accounts, frequency of activity, time interval an account is active, etc.), where any quantity of failed verifications (e.g. one or more failed verifications, etc.) may indicate a user does not correspond to an entity of a reserved name. The verification may detect a login or other access to any quantity of entity accounts in any fashion (e.g., response from account, a transaction conducted within the account, etc.), where detection of access for any quantity of accounts (e.g. one or more accounts, etc.) may be used to verify the user. The verification may permit any number of access attempts to verify a user (e.g., in a range of one through five, etc.). In addition, the verification may provide any desired time interval for accessing an account (e.g., in a range of one through five minutes, etc.).

The verification may provide any information to a user to post to any quantity of entity accounts (e.g., signature, code, message, etc.), where detection of the posting on any quantity of accounts (e.g., one or more accounts, etc.) may be used to verify the user. The information may include any quantity of alphanumeric or other characters, symbols, and/or numerals. The posting may include any type of identifier to indicate the post corresponds to the verification (e.g., account identifier, etc.). The verification may provide any desired time interval for posting of the information (e.g., in a range of one through five minutes, etc.).

The verification may detect any operation in an electronic wallet of the entity of a reserved name to verify the user (e.g., sign a message or transaction, a dummy transaction, access to the wallet, etc.). The verification may provide any desired time interval for performing the operation in the wallet (e.g., in a range of one through five minutes, etc.).

The verification may detect any file or record corresponding to a registered reserved name at any location. The file or record may be of any type, and include any information corresponding to the registration. The verification may provide any information to a user to insert in any quantity of records (e.g., message, setting, etc.), where detection of the information in any quantity of records (e.g., one or more records, etc.) may be used to verify the user. The information may include any quantity of alphanumeric or other characters, symbols, and/or numerals. Alternatively, the presence of the file or any new records may be used to verify the user. The verification may permit any number of attempts to provide proof of registration to verify a user (e.g., in a range of one through five, etc.). In addition, the verification may provide any desired time interval for providing proof of registration (e.g., in a range of one through five minutes, etc.).

The verification may use any quantity of any biometrics to verify the user (e.g., face, fingerprints, iris patterns, etc.), where any quantity of biometrics (e.g., one or more biometrics, etc.) corresponding between the user and identification may verify the user. The identification may be any identification (e.g., license, passport, etc.) issued by an official entity or organization (e.g., government, state, country, etc.). The identification may display information (e.g., name, etc.) and images of biometrics, and/or may include a memory device containing this information. The biometrics of the user and for the identification may be compared using any conventional or other techniques (e.g., image analysis, machine learning, etc.).

The requested domain name may be registered on any quantity of any types of domain name registries for any types of systems (e.g., centralized, de-centralized, hybrid, etc.). The registration may be stored on the domain name registry in any fashion (e.g., one or more records of a registry, a non-fungible or other token of a wallet (based on the registration being on a blockchain), etc.).

Having described preferred embodiments of a new and improved system, method, and computer program product for domain name registration based on verification of entities of reserved names, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of registering a domain name for access to a domain over a network comprising:
    determining, via at least one processor, that a domain name requested for registration on a domain name registry by a user corresponds to a reserved name of an entity by searching a plurality of network sites for use of the domain name and an indication of the entity, wherein the reserved name is used by the entity on at least one network site;
    determining, via the at least one processor, a user account of the entity from the at least one network site;
    verifying, via the at least one processor, the user corresponds to the entity based on detecting performance of an operation by the user on a computing device in the user account of the entity, wherein the operation is enabled in response to verification of the entity; and
    registering, via the at least one processor, the domain name on the domain name registry in response to the user corresponding to the entity.

2. The method of claim 1, wherein the domain name is one of a blockchain domain name and a non-fungible token domain name.

3. The method of claim 1, wherein determining the user account of the entity comprises:
    selecting the user account of the entity for a network site from among a plurality of user accounts of the entity for different network sites; and
    verifying the user corresponds to the entity comprises:
    detecting a login to the selected account by the user.

4. The method of claim 1, wherein determining the user account of the entity comprises:
    selecting the user account of the entity for a network site from among a plurality of user accounts of the entity for different network sites; and
    verifying the user corresponds to the entity comprises:
    providing information to the user for posting to the selected account; and
    detecting a post with the provided information to the selected account.

5. The method of claim 1, wherein verifying the user corresponds to the entity comprises:
    detecting the performance of the operation by the user in an electronic wallet of the entity.

6. The method of claim 1, wherein the reserved name includes a registered domain name, and verifying the user corresponds to the entity comprises:
    verifying proof of registration of the registered domain name, wherein the proof of registration includes one of a file and a record based on the registration and is generated for the user from the user account of the entity for a network site.

7. The method of claim 1, wherein verifying the user corresponds to the entity further comprises:
    obtaining, via the at least one processor, an image of the user via an image capture device, wherein the image of the user includes one or more biometrics of the user;
    obtaining, via the at least one processor, image information from an official identification of the entity, wherein the image information includes one or more biometrics of the entity; and
    verifying, via the at least one processor, the user corresponds to the entity further based on a comparison of the image of the user to the image information of the official identification indicating at least one biometric of the user corresponds to at least one biometric of the entity.

8. The method of claim 2, wherein the domain name is a non-fungible token domain name, and registering the domain name on the domain name registry comprises:
    storing registration of the domain name on a blockchain associated with the domain name registry; and
    generating a non-fungible token associated with a cryptocurrency wallet address of the user corresponding to the registration of the domain name.

9. A system for registering a domain name for access to a domain over a network comprising:
    one or more memories; and
    at least one processor coupled to the one or more memories, the at least one processor configured to:
    determine that a domain name requested for registration on a domain name registry by a user corresponds to a reserved name of an entity by searching a plurality of network sites for use of the domain name and an indication of the entity, wherein the reserved name is used by the entity on at least one network site;
    determine a user account of the entity from the at least one network site;
    verify the user corresponds to the entity based on detecting performance of an operation by the user on a computing device in the user account of the entity, wherein the operation is enabled in response to verification of the entity; and
    register the domain name on the domain name registry in response to the user corresponding to the entity.

10. The system of claim 9, wherein the domain name is one of a blockchain domain name and a non-fungible token domain name.

11. The system of claim 9, wherein determining the user account of the entity comprises:
    selecting the user account of the entity for a network site from among a plurality of user accounts of the entity for different network sites; and
    verifying the user corresponds to the entity comprises:
    detecting a login to the selected account by the user.

12. The system of claim 9, wherein determining the user account of the entity comprises:
    selecting the user account of the entity for a network site from among a plurality of user accounts of the entity for different network sites; and
    verifying the user corresponds to the entity comprises:
    providing information to the user for posting to the selected account; and
    detecting a post with the provided information to the selected account.

13. The system of claim 9, wherein verifying the user corresponds to the entity comprises:
    detecting the performance of the operation by the user in an electronic wallet of the entity.

14. The system of claim 9, wherein the reserved name includes a registered domain name, and verifying the user corresponds to the entity comprises:
  verifying proof of registration of the registered domain name, wherein the proof of registration includes one of a file and a record based on the registration and is generated for the user from the user account of the entity for a network site.

15. The system of claim 9, wherein verifying the user corresponds to the entity further comprises:
  obtaining an image of the user via an image capture device, wherein the image of the user includes one or more biometrics of the user;
  obtaining image information from an official identification of the entity, wherein the image information includes one or more biometrics of the entity; and
  verifying the user corresponds to the entity further based on a comparison of the image of the user to the image information of the official identification indicating at least one biometric of the user corresponds to at least one biometric of the entity.

16. The system of claim 10, wherein the domain name is a non-fungible token domain name, and registering the domain name on the domain name registry comprises:
  storing registration of the domain name on a blockchain associated with the domain name registry; and
  generating a non-fungible token associated with a cryptocurrency wallet address of the user corresponding to the registration of the domain name.

17. A computer program product for registering a domain name for access to a domain over a network, the computer program product comprising one or more non-transitory computer readable media having instructions stored thereon, the instructions executable by at least one processor to cause the at least one processor to:
  determine that a domain name requested for registration on a domain name registry by a user corresponds to a reserved name of an entity by searching a plurality of network sites for use of the domain name and an indication of the entity, wherein the reserved name is used by the entity on at least one network site;
  determine a user account of the entity from the at least one network site;
  verify the user corresponds to the entity based on detecting performance of an operation by the user on a computing device in the user account of the entity, wherein the operation is enabled in response to verification of the entity; and
  register the domain name on the domain name registry in response to the user corresponding to the entity.

18. The computer program product of claim 17, wherein the domain name is one of a blockchain domain name and a non-fungible token domain name.

19. The computer program product of claim 17, wherein determining the user account of the entity comprises:
  selecting the user account of the entity for a network site from among a plurality of user accounts of the entity for different network sites; and
  verifying the user corresponds to the entity comprises:
  detecting a login to the selected account by the user.

20. The computer program product of claim 17, wherein determining the user account of the entity comprises:
  selecting the user account of the entity for a network site from among a plurality of user accounts of the entity for different network sites; and
  verifying the user corresponds to the entity comprises:
  providing information to the user for posting to the selected account; and
  detecting a post with the provided information to the selected account.

21. The computer program product of claim 17, wherein verifying the user corresponds to the entity comprises:
  detecting the performance of the operation by the user in an electronic wallet of the entity.

22. The computer program product of claim 17, wherein the reserved name includes a registered domain name, and verifying the user corresponds to the entity comprises:
  verifying proof of registration of the registered domain name, wherein the proof of registration includes one of a file and a record based on the registration and is generated for the user from the user account of the entity for a network site.

23. The computer program product of claim 17, wherein verifying the user corresponds to the entity further comprises:
  obtaining an image of the user via an image capture device, wherein the image of the user includes one or more biometrics of the user;
  obtaining image information from an official identification of the entity, wherein the image information includes one or more biometrics of the entity; and
  verifying the user corresponds to the entity further based on a comparison of the image of the user to the image information of the official identification indicating at least one biometric of the user corresponds to at least one biometric of the entity.

24. The computer program product of claim 18, wherein the domain name is a non-fungible token domain name, and registering the domain name on the domain name registry comprises:
  storing registration of the domain name on a blockchain associated with the domain name registry; and
  generating a non-fungible token associated with a cryptocurrency wallet address of the user corresponding to the registration of the domain name.

\* \* \* \* \*